May 12, 1936.  C. C. McCAIN  2,040,323
MATERIAL WINDING MACHINE
Filed July 12, 1933  14 Sheets-Sheet 1
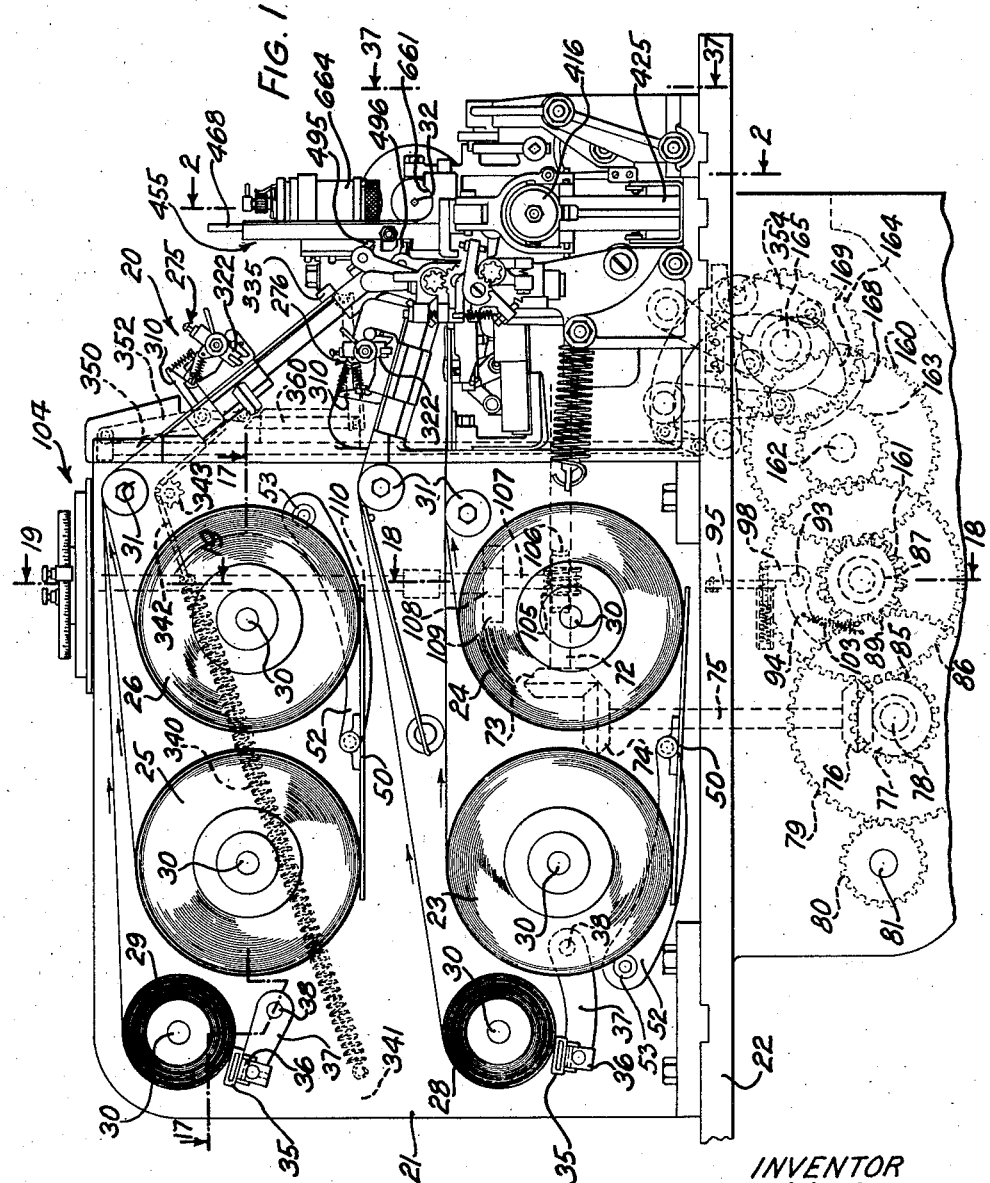
INVENTOR
C.C.MCCAIN
BY H.A.Whitehorn
ATTORNEY

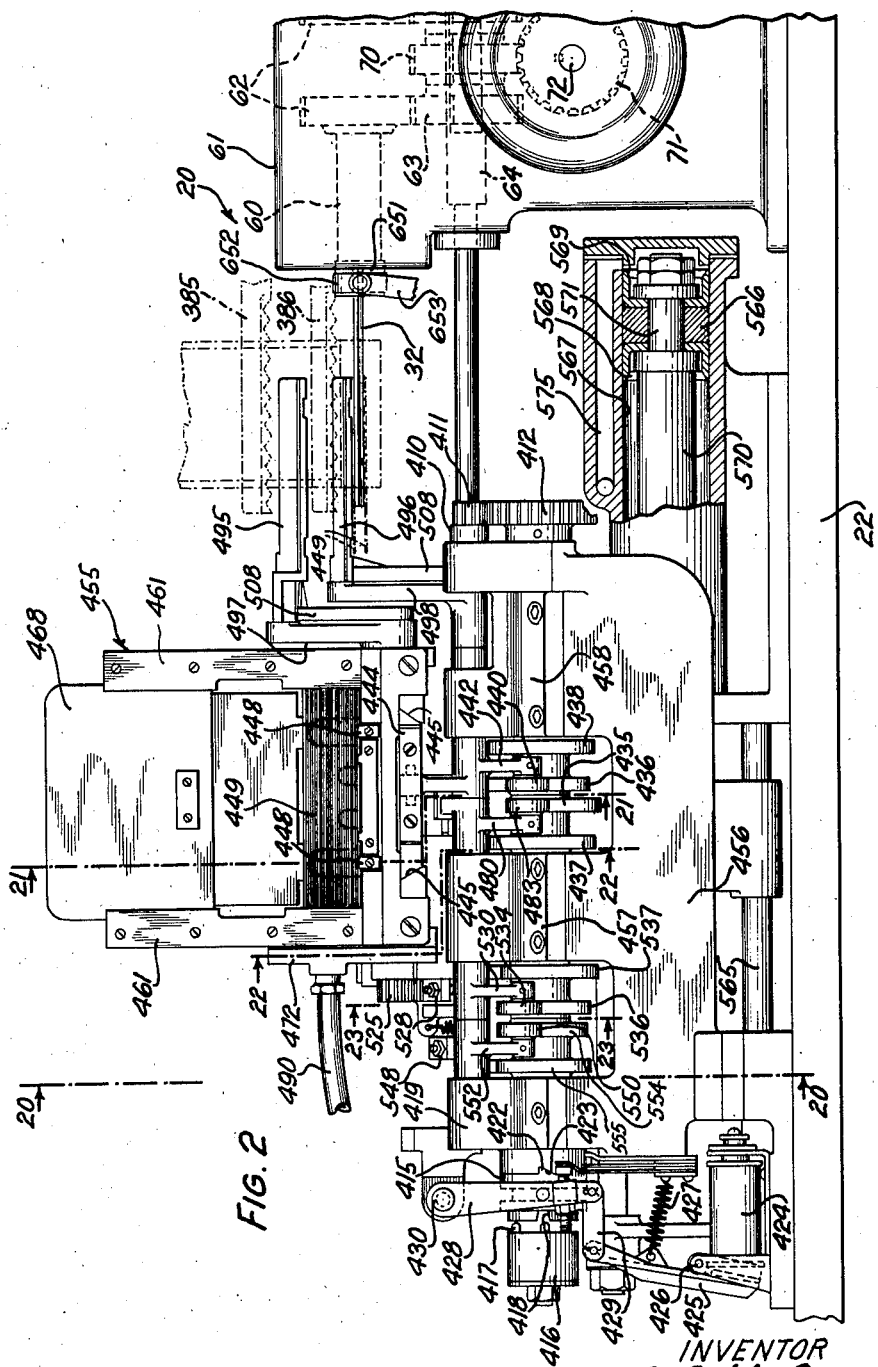

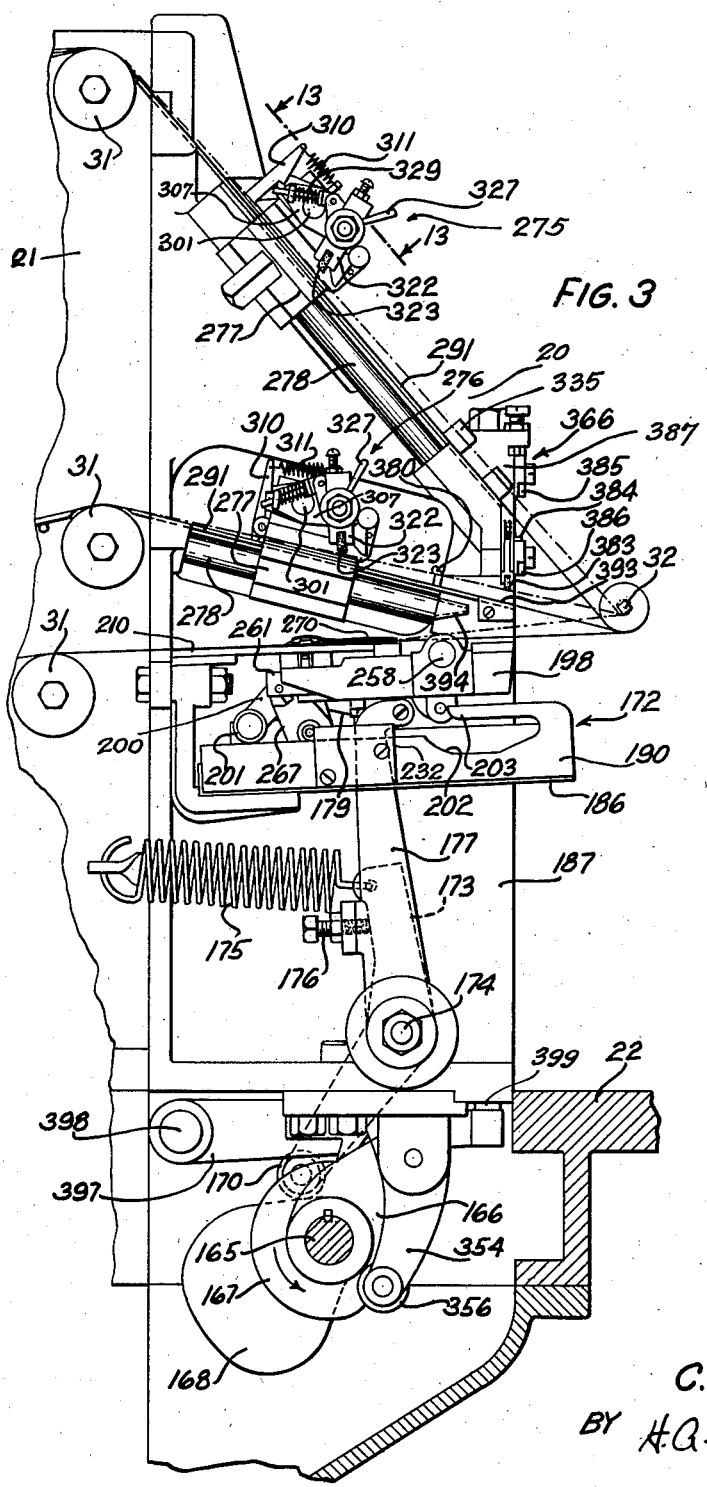

May 12, 1936.  C. C. McCAIN  2,040,323
MATERIAL WINDING MACHINE
Filed July 12, 1933  14 Sheets-Sheet 4
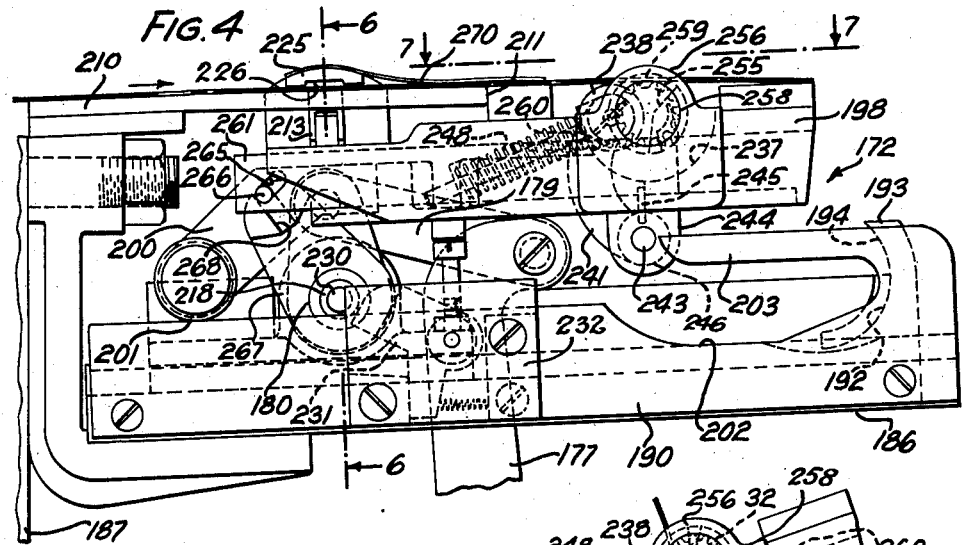
INVENTOR
C.C. McCAIN
BY H.A. Whitehorn
ATTORNEY May 12, 1936.   C. C. McCAIN   2,040,323
MATERIAL WINDING MACHINE
Filed July 12, 1933   14 Sheets-Sheet 5

INVENTOR
C. C. McCAIN
BY H. Q. Whitehorn
ATTORNEY

May 12, 1936. C. C. McCAIN 2,040,323
MATERIAL WINDING MACHINE
Filed July 12, 1933 14 Sheets-Sheet 6

INVENTOR
C. C. McCAIN
BY H. A. Whitehorn
ATTORNEY

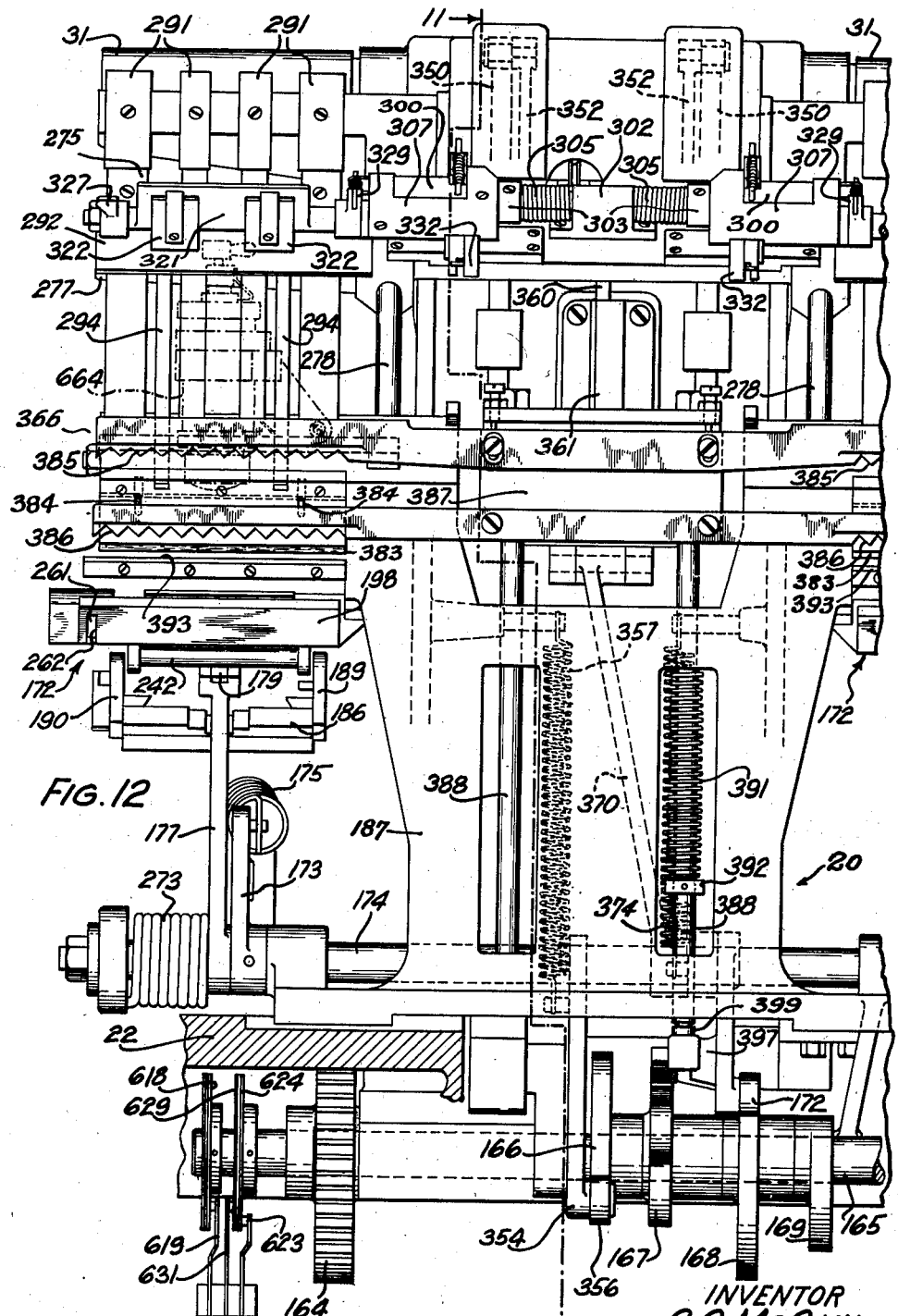

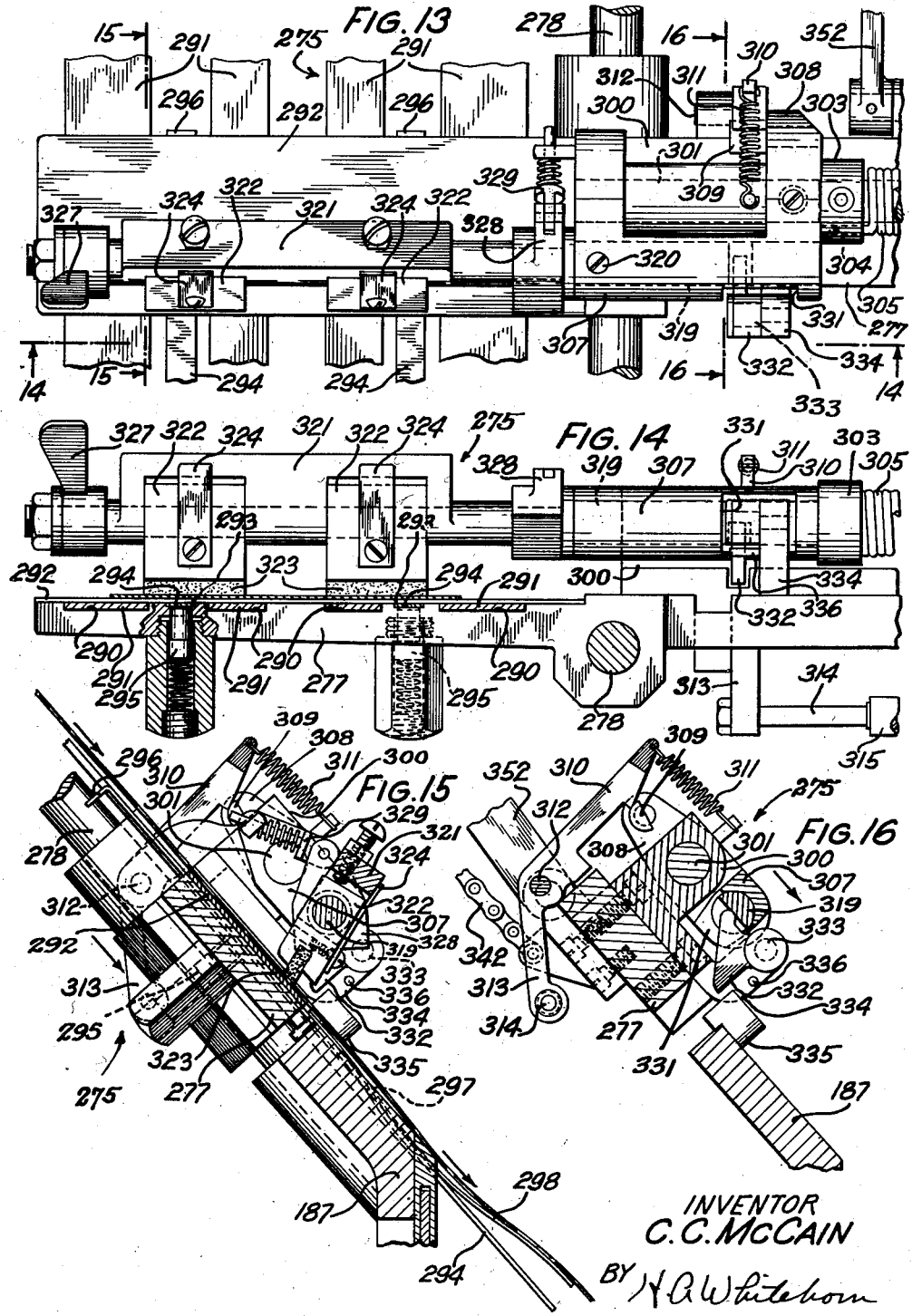

May 12, 1936.                  C. C. McCAIN                    2,040,323
                        MATERIAL WINDING MACHINE
                   Filed July 12, 1933         14 Sheets-Sheet 9
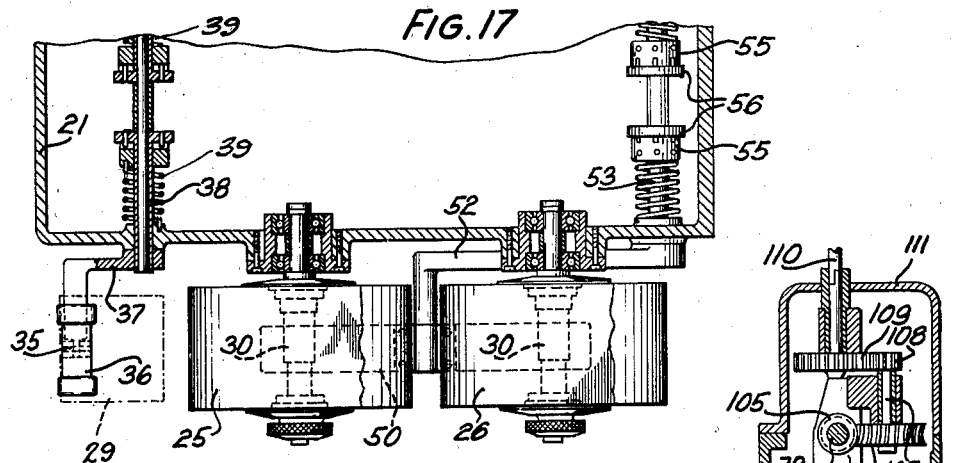
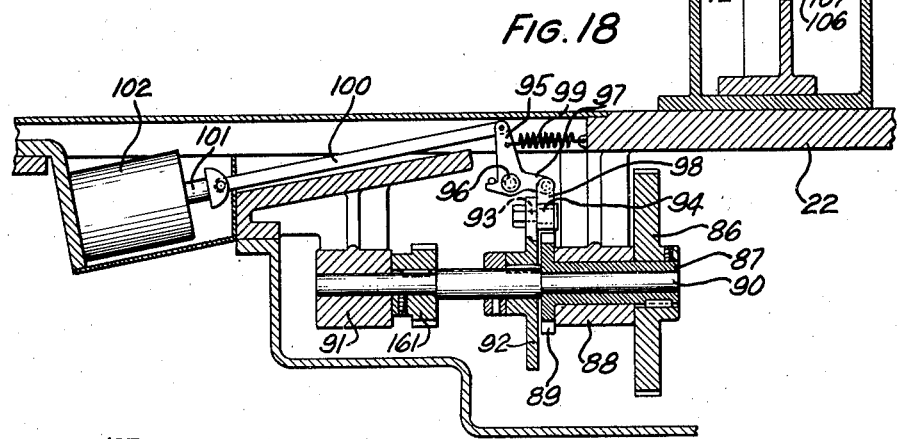
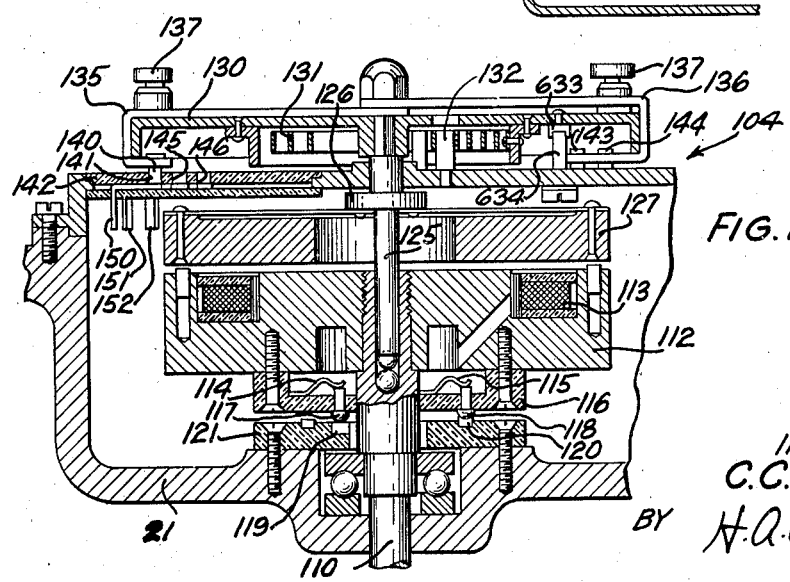
INVENTOR
C.C. McCAIN
BY H.Q.Whitehorn
ATTORNEY

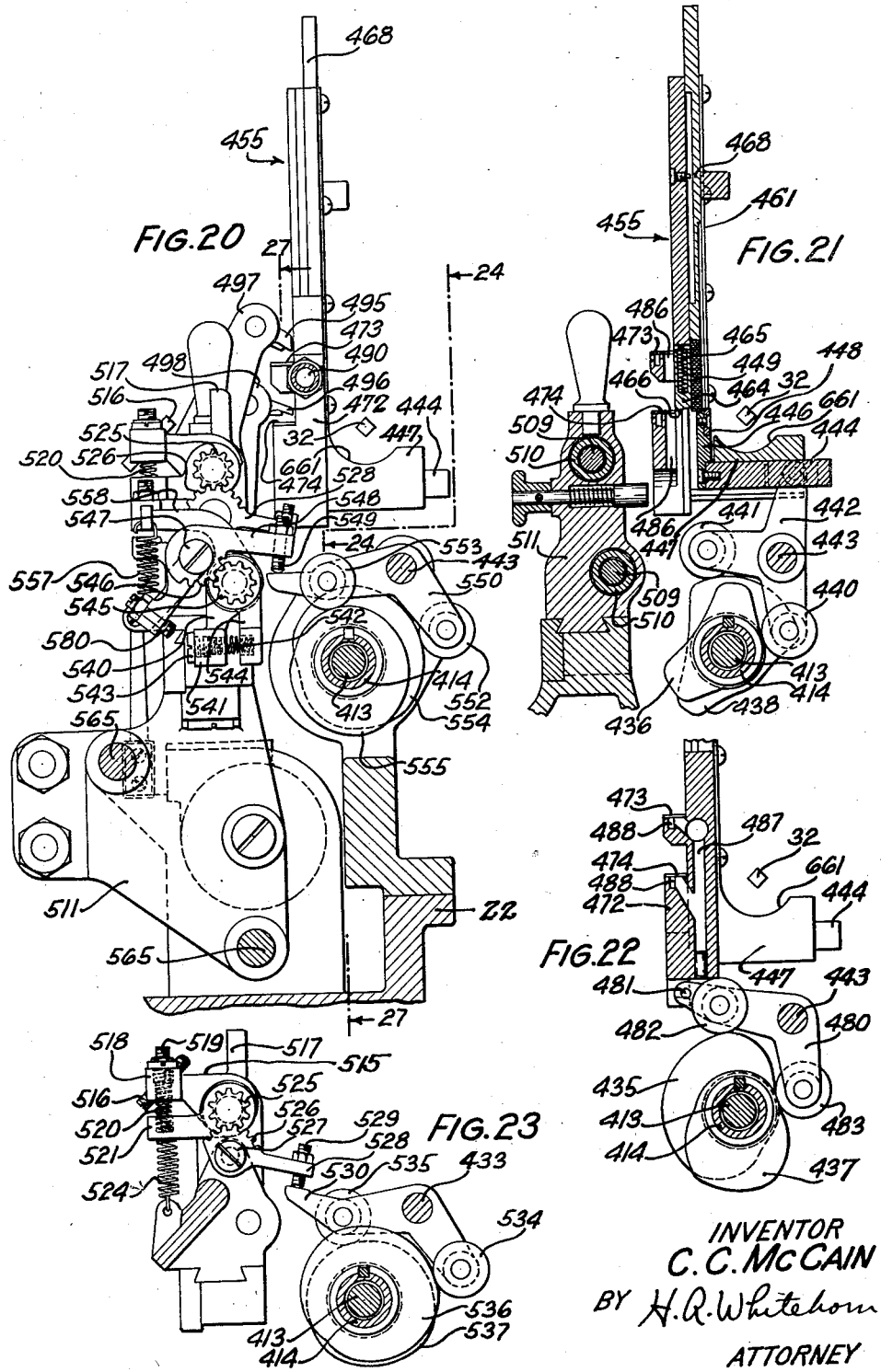

May 12, 1936.　　　　C. C. McCAIN　　　　2,040,323
MATERIAL WINDING MACHINE
Filed July 12, 1933　　　14 Sheets-Sheet 11
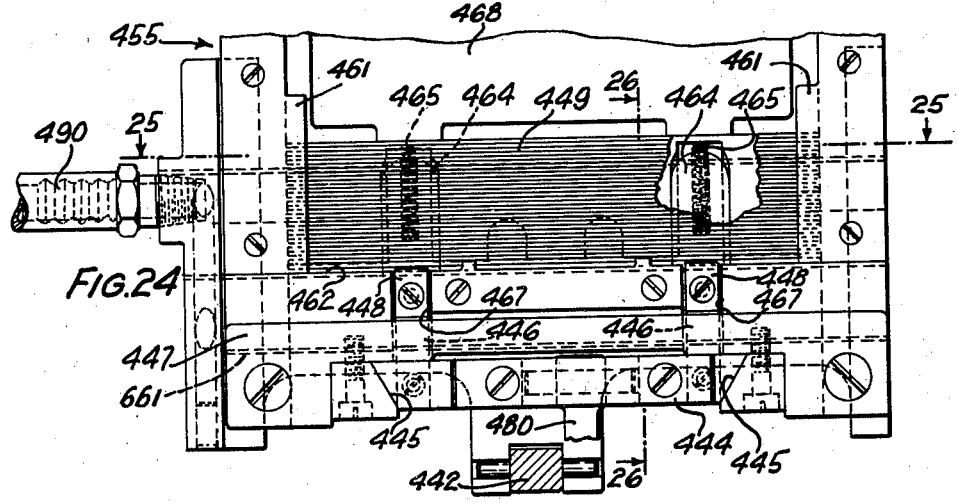
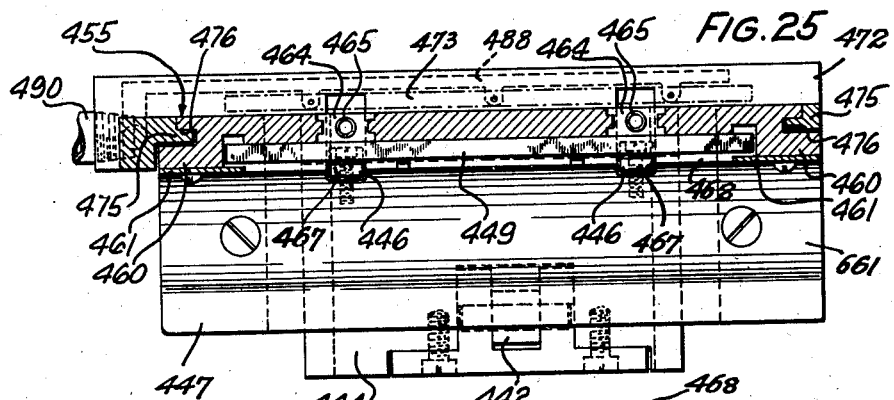
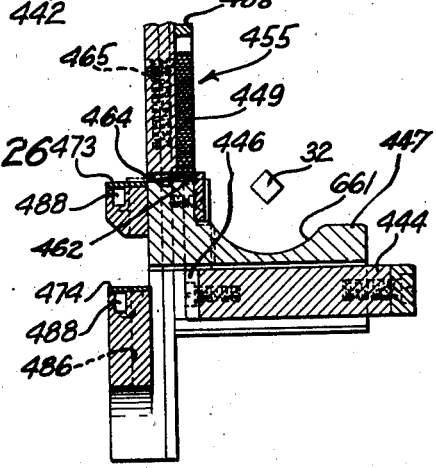
INVENTOR
C. C. McCAIN
BY H. A. Whitehorn
ATTORNEY

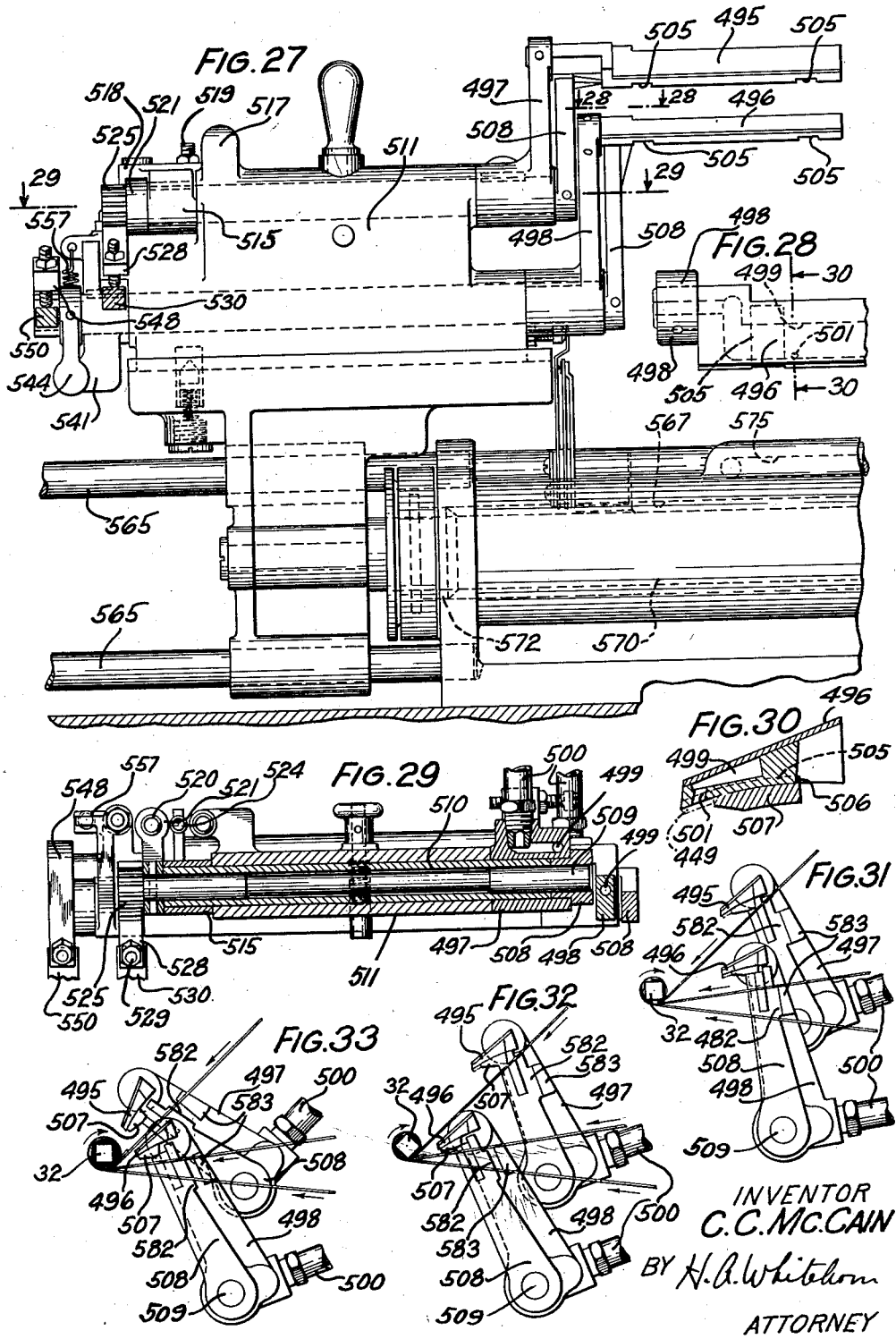

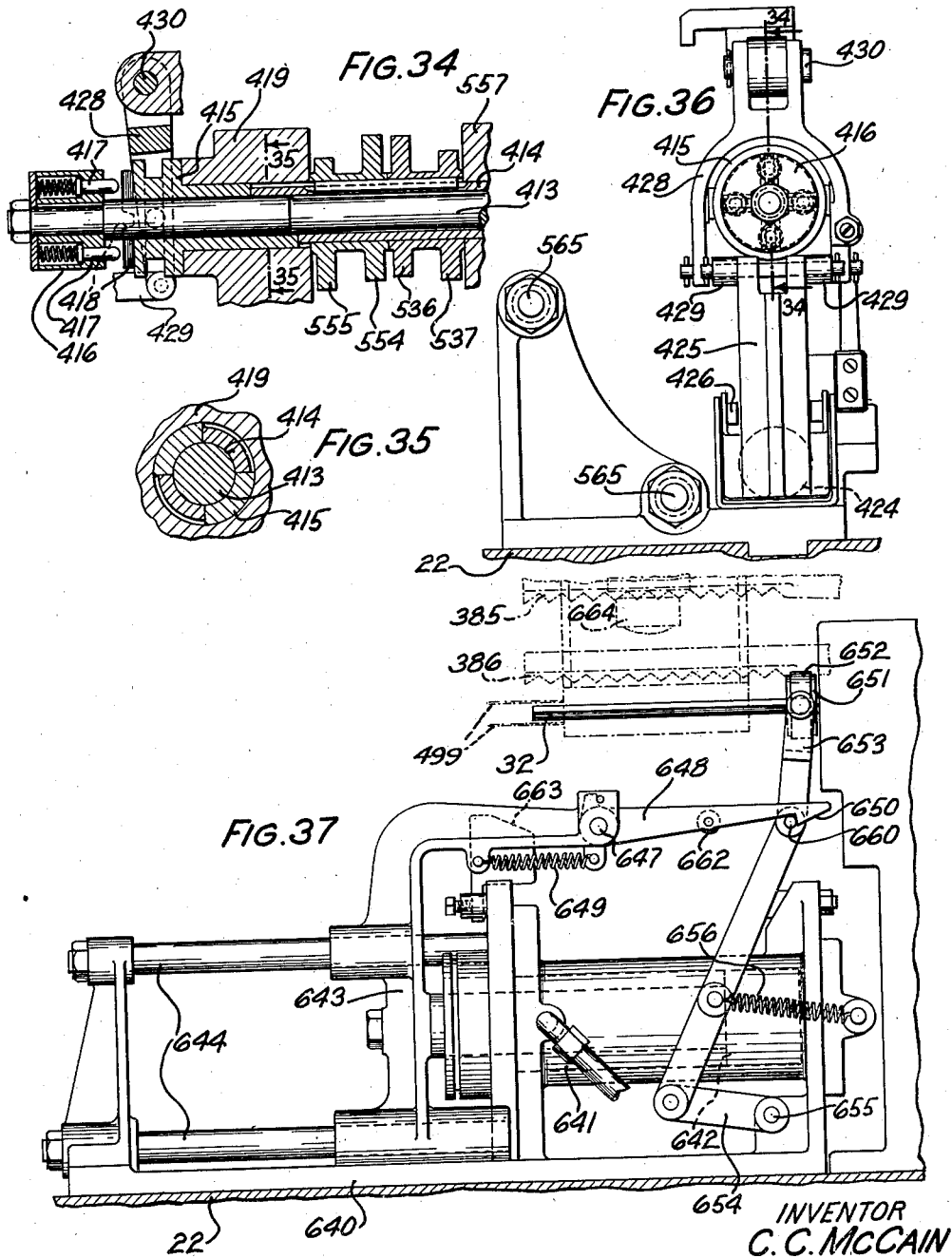

Patented May 12, 1936

2,040,323

UNITED STATES PATENT OFFICE 2,040,323

MATERIAL WINDING MACHINE

Cecil C. McCain, Glen Ellyn, Ill., assignor to Western Electric Company, Incorporated, New York, N. Y., a corporation of New York Application July 12, 1933, Serial No. 680,008

31 Claims. (Cl. 242—56)

This invention relates to material winding machines, and more particularly to a machine for automatically forming electrostatic condensers.

This invention is an improvement over the copending application of Chester A. Purdy, Serial No. 372,818, filed June 22, 1929 now Patent 1,963,318, dated June 19, 1934 on condenser winding machines.

The primary object of this invention is to provide a compact and efficient winding machine for automatically and rapidly forming material into condensers.

In accordance with the object, one embodiment of the invention contemplates the provision of an automatic condenser winding machine comprising a rotatable winding arbor, supply rolls of paper and foil to be fed to the arbor, a wrapping unit arranged to advance two strips of paper from the rolls and wrap the forward ends thereof around the arbor and reciprocable feed tables for automatically advancing other strips of paper and foil from the supply rolls so that their forward ends will be received between the convolutions of the paper upon the arbor.

In this embodiment of the invention there are also provided improved automatic means for supplying terminals to the condenser while it is being wound, for severing the paper and foil in the proper sequence, for ejecting the wound condensers and for repeating the operations just described.

Other objects and advantages will be apparent from the following description when taken in conjunction with the accompanying drawings, wherein Fig. 1 is a side elevational view of the material winding machine, portions thereof being removed for the purpose of clearness;

Fig. 2 is a front elevational view of the terminal feed mechanism taken substantially along the line 2—2 of Fig. 1;

Fig. 3 is a side elevational view of the paper and foil feeding mechanism showing the actuating means for the wrapping unit;

Fig. 4 is an enlarged fragmentary side elevational view of the wrapping unit in normal or inoperative position;

Fig. 5 is a side elevational view of the wrapping unit in operative position;

Fig. 10 is a sectional view taken along the line 10—10 of Fig. 6;

Fig. 12 is a fragmentary front elevational view of the paper and foil feeding mechanism shown in Figs. 3 and 11;

Fig. 13 is a top plan view of the upper feed table taken along the line 13—13 of Fig. 3;

Fig. 14 is a sectional view taken along the line 14—14 of Fig. 13;

Fig. 15 is a sectional view taken along the line 15—15 of Fig. 13;

Fig. 16 is a sectional view taken along the line 16—16 of Fig. 13;

Fig. 17 is a horizontal sectional view taken substantially along the line 17—17 of Fig. 1;

Fig. 18 is a vertical sectional view taken along the line 18—18 of Fig. 1;

Fig. 19 is a vertical sectional view of the counting mechanism taken along the line 19—19 of Fig. 1;

Fig. 20 is a vertical sectional view of the terminal feed mechanism taken substantially along the line 20—20 of Fig. 2;

Fig. 21 is a vertical sectional view taken substantially along the line 21—21 of Fig. 2;

Fig. 22 is a vertical sectional view taken substantially along the line 22—22 of Fig. 2;

Fig. 23 is a vertical sectional view taken substantially along the line 23—23 of Fig. 2;

Fig. 24 is a fragmentary front elevational view of the terminal supplying mechanism taken substantially along the line 24—24 of Fig. 20;

Fig. 25 is a horizontal sectional view taken along the line 25—25 of Fig. 24;

Fig. 26 is a vertical sectional view taken along the line 26—26 of Fig. 24;

Fig. 27 is a fragmentary front elevational view of the terminal feed mechanism taken substantially along the line 27—27 of Fig. 20;

Fig. 28 is an enlarged fragmentary top plan view of one of the feed fingers, the view being taken along the line 28—28 of Fig. 27;

Fig. 29 is a horizontal sectional view taken along the line 29—29 of Fig. 27;

Fig. 30 is an enlarged sectional view through one of the feed fingers, the section being taken along the line 30—30 of Fig. 28;

Figs. 31, 32 and 33 are fragmentary end elevational views of the feed fingers respectively, illustrating their normal positions, their positions when the lower feed finger releases its terminal and their positions when the upper feed finger releases its terminal;

Fig. 34 is a fragmentary longitudinal sectional view of the cam shaft of the terminal feed mechanism showing the clutch for bringing about its operative connection with a power means;

Fig. 35 is a vertical sectional view taken along the line 35—35 of Fig. 34;

Fig. 36 is an end elevational view of the actuating means for the clutch shown in Fig. 34;

Fig. 37 is a front elevational view of the condenser ejecting means taken along the line 37—37 of Fig. 1.

Figure 6:
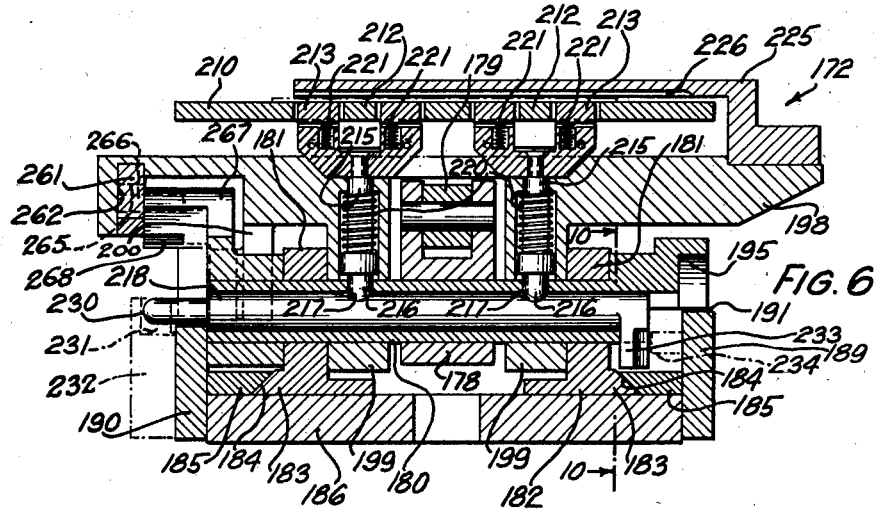
Fig. 6 is a sectional view taken substantially along the line 6—6 of Fig. 4.
Figure 7:
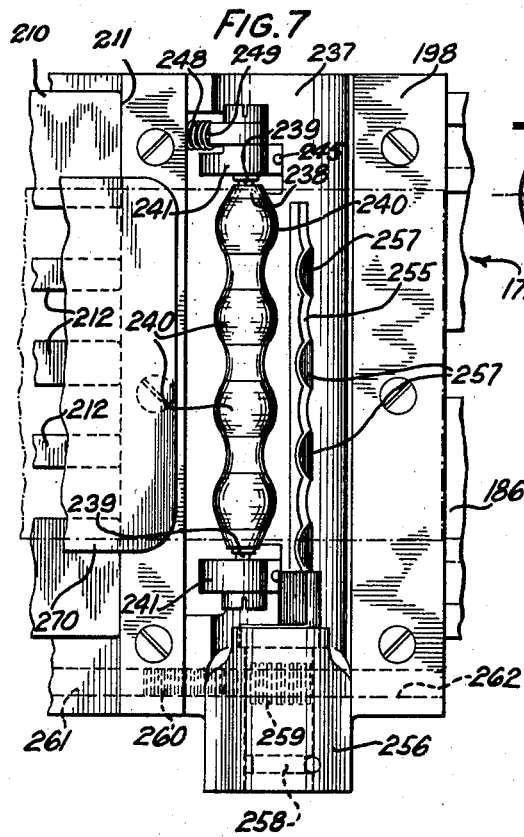
Fig. 7 is a fragmentary top plan view of the wrapping unit taken substantially along line 7—7 of Fig. 4.
Figure 8:
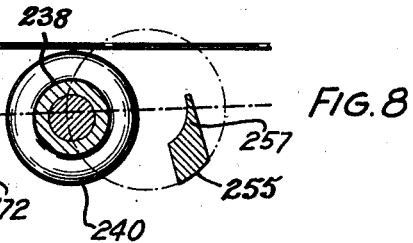
Figs. 8 and 9 are fragmentary sectional views of the wrapping unit respectively showing the positions of the wrapping elements just before and during the wrapping operation.
Figure 9:
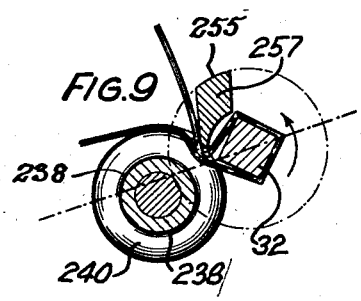

Referring now to the drawings wherein like reference numerals designate similar parts throughout the various views, the numeral 20 designates a winding mechanism including a central vertical frame 21 secured to a bed plate 22 and supporting on both sides thereof the supply rolls of condenser paper 23, 24, 25 and 26, and tin foil 28 and 29 rotatably mounted on spindles 30 journaled in the sides of the frame 21. A plurality of anti-friction idler rollers 31 journaled in the frame 21 are provided at suitable positions for supporting and guiding the paper and foil to a winding arbor 32.

The present embodiment is provided with two sets of mechanisms, one upon each side of the frame 21 for supplying paper and foil to a winding arbor 32 for each mechanism so that the machine may simultaneously wind two condensers; however, in view of the fact that each set of mechanisms are substantially identical in construction, the description will be concentrated upon one set and will apply equally well to the other.

In order to maintain the proper tension on the tin foil as it is wound on the arbor 32, upper and lower foil brakes 35 are provided and are composed of equalizing members 36 having lateral portions (Figs. 1 and 17) covered with strips of material such as felt which is disposed in engagement with the rolls of tin foil 28 and 29. Each foil brake is carried upon the outer end of a lever 37, the other end of which is fixed to the outer end of a shaft 38 extending through the frame 21 and urged in a clockwise direction by a torsion spring 39. The upper foil brakes are mounted upon the outer ends of one shaft 38, while the lower foil brakes are mounted upon the outer ends of the other shaft 38.

To properly tension the insulating paper as it is removed from the rolls 23 to 26 inclusive, resistance members 50 (Figs. 1 and 17) are provided for the upper and lower rolls of paper. The resistance members 50 are in the form of resilient strips of metal pivotally supported at their centers upon the outer ends of levers 52, the other ends of which are fixed to shafts 53, extending through and journaled in the vertical frame 21. A torsion spring 54 is disposed concentric with each of the shafts 53, and by viewing the spring of the upper resistance member, shown in Fig. 17, it will be observed that the inner ends thereof are fixed to adjustable collars 55. The adjustable collars 55 while the outer ends thereof are fixed to the frame 21 are rotatably mounted upon the shaft 53 and have notches therein for receiving laterally extending pins of hub members 56 which are fixed to the shaft 53. The tension of the spring 54 normally urges the resistance member 50 into intimate engagement with the rolls of insulating paper, and due to its pivotal connection to the lever 52 equal pressure will be applied to each roll of paper. This pressure may be varied by adjustment of the collars 55 relative to the hub members 56 to vary the force of the spring 54. A similar adjusting means is provided for the torsion springs 39 (Fig. 17) to vary the tension of the tin foil from the rolls 28 and 29.

The winding arbor 32 has its inner end secured in a spindle 60 journaled in suitable bearings in a housing 61 which is secured to the bed plate 22 at the front of the machine. A gear 62 is mounted upon the inner end of the spindle 60 which interengages a gear 63 secured to a shaft 64. The shaft 64 in turn is driven by a worm 70 keyed thereto and interengaging a worm gear 71 which is keyed to a driven shaft 72. The driven shaft 72 extends rearwardly, as shown in Fig. 1, and has mounted upon the inner end thereof a bevel gear 73 which interengages a bevel gear 74, the latter being fixedly mounted upon the upper end of a vertical shaft 75. The lower end of the vertical shaft 75 has a bevel gear 76 fixedly mounted thereupon, which interengages a bevel gear 77 of a horizontal shaft 78, the latter having a gear 79 mounted thereupon and meshing with a pinion 80 of a drive shaft 81. The drive shaft 81 is operatively connected to any suitable power means, such as a motor hereinafter described.

Mounted upon the shaft 78 is a pinion 85, which interengages a gear 86 of a hollow shaft 87 (Figs. 1 and 18). The hollow shaft 87 is journaled in a bearing 88 carried by the bed plate 22 and has at its inner end a clutch member or sprocket wheel 89. A solid shaft 90, having one end rotatably disposed in the hollow shaft 87 and the other end journaled in a bearing 91 carried by the bed plate 22, has a hub member 92 mounted thereupon for pivotally supporting at 93 a pawl or clutch element 94. A latch 95, pivotally supported at 96 and having an arm 97 normally held in general alignment with a vertically extending arm 98 of the pawl 94 by a spring 99, is operatively connected by means of a link 100 to a core 101 of a solenoid 102. The pawl 94 when released by the latch 95 is moved into engagement with the sprocket wheel or clutch member 89 by means of a spring 103.

The solenoid 102 is controlled by a counting mechanism, indicated generally at 105 (Figs. 1 and 19), through a circuit (hereinafter described) which is closed by contacts of the counting mechanism after a predetermined number of convolutions of material have been wound upon the arbor 32. The counting mechanism is operatively connected to the power means from the shaft 72 (Figs. 1 and 18) upon which is mounted a worm 105 disposed in operative engagement with a worm gear 106 of a shaft 107. The shaft 107 is journaled in a bearing and has a pinion 108 fixed to its upper end and in engagement with a gear 109 of a vertical shaft 110, the latter extending upwardly through a casing 111 and journaled in a bearing carried by a depressed portion of the frame 21. Secured to the upper end of the shaft 110 is an electromagnet 112 carrying an energizing coil 113, the terminals of which are connected to spring contacts 114 and 115 secured to an insulator 116, which is fixed to the underside of an electromagnet. The spring contacts 114 and 115 in turn resiliently engage contacts 117 and 118, which slidably contact with rings 119 and 120 mounted in a stationary insulator 121 and connected to a source of electrical energy in a manner hereinafter described.

Journaled within a vertical bore in the upper end of the shaft 110 is a smaller shaft 125 to a shoulder 126 of which is secured an iron disk 127 adapted to be attracted and rotated by the electromagnet 112 when it is energized. The shaft 125 terminates at its upper end in a square shank carrying a circular member 130 graduated in revolutions of the winding arbor and on the underside of which is secured one end of a torsion spring 131 having its other end secured to a stationary pin 132. Carried by the shaft 125 is a pair of grounded contacting arms 135 and 136 frictionally rotatable about the circular member 130 and having clamp nuts 137 for securing the arms to the circular member in predetermined positions according to the number of turns of foil and paper to comprise the particular type of condenser being manufactured. The arms 135 and 136 are bent in under the circular member 130, the arm 135 carrying a contact 140 adapted to engage a contact 141 mounted in an insulator 142 of the cover plate, and the arm 136 carrying contacts 143 and 144 adapted to engage contacts 145 and 146, respectively, mounted in the insulator 142. The contacts 141, 145 and 146 are respectively connected through terminals 150, 151 and 152 to units hereinafter described.

Figure 11:
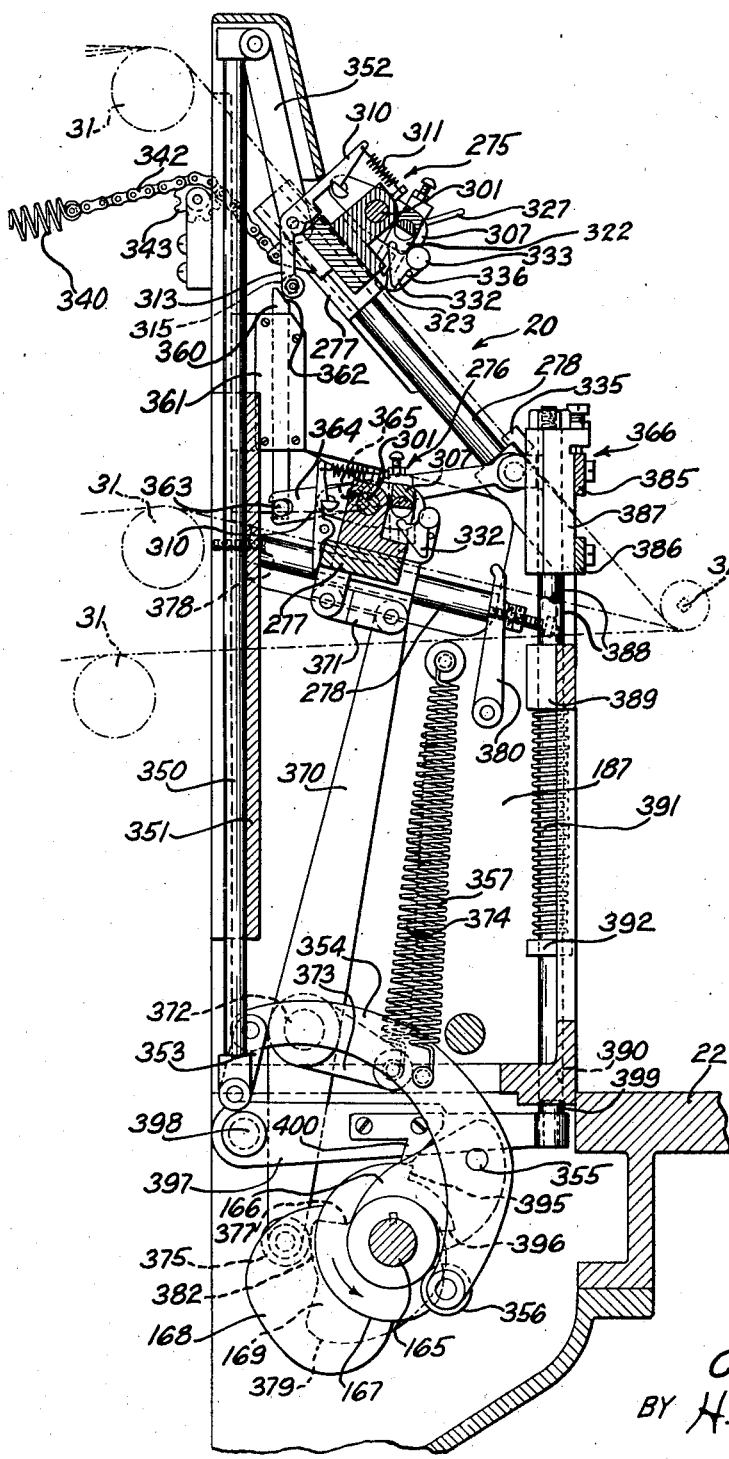
Fig. 11 is a fragmentary vertical sectional view of the reciprocable feed table actuating mechanism taken along the line 11—11 of Fig. 12.

When the solenoid 102 (Fig. 18) is energized to actuate the latch 95 and to release the pawl 94, an actuating mechanism for the cutting unit, the wrapping unit and the reciprocable feed tables is operatively connected to the power means through the shaft 90, the hub 92, the pawl 94, the clutch member 89, the hollow shaft 87, the gear 86 and back through the pinion 85, the shaft 78, the gear 79, the pinion 80 and the drive shaft 81. This mechanism comprises a gear 160 (Fig. 1), which interengages a pinion 161 mounted upon and fixed to the shaft 90. The gear 160 is mounted upon a shaft 162, which also has mounted thereupon a pinion 163 positioned in engagement with a gear 164 of a cam shaft 165. The cam shaft 165 is journaled in suitable bearings and has mounted thereupon cams 166, 167, 168 and 169 (Figs. 3, 11 and 12).

The cam 168 is arranged to actuate a wrapping unit indicated generally at 172 (Figs. 3 to 10 inclusive) and has disposed in engagement therewith a cam roller 170 mounted upon the lower arm of an actuating lever 173. The actuating lever 173 is mounted upon a pivot shaft 174 and has its upper arm connected to a spring 175, which normally urges the lever in a counterclockwise direction and holds the cam roller 170 in engagement with the cam 168. The upper arm of the lever 173 is held in abutting engagement with an adjustable stop 176 carried by an actuating arm 177, the lower end of which is fixed to the pivot shaft 174, while the upper end is connected to a lever 178 through a link 179. The lever 178 is fixed to a hollow shaft 180 at substantially the center thereof, the hollow shaft being journaled in vertically extending bearing members 181 of a slide 182. The slide 182 has laterally extending tongue portions 183 slidably disposed in grooves 184 formed by retaining strips 185 having tapered inner edges secured to a support 186. The support 186 is fixedly mounted upon a vertical frame 187 by means of bolts, the frame being mounted upon the bed plate 22. Side members 189 and 190 are fixed to the support 186, the side member 189 having a flat upper surface 191 terminating at its forward extremity in an arcuate shaped groove 192 (Fig. 10) adjacent to which is disposed a guide 193 having an arcuate surface 194 merging into the foremost surface of the groove 192 and serving as a stop member as hereinafter described. The hollow shaft 180 has disposed upon one end thereof a semi-circular locking flange 195, the ends of which are positioned to ride upon the surface 191 of the side member 189 until the flange abuts the surface 194 of the stop member 193, at which time the flange may be moved into the arcuate shaped groove 192 by the rotation of the hollow shaft 180 as hereinafter described. A carriage 198 has downwardly projecting portions 199 through which the hollow shaft 180 extends and is rotatable therein. Fixed to the carriage 198 is an arm 200 carrying at its lower extremity a cam roller 201 positioned to ride upon the upper surface of the side member 190 until it reaches a cutaway portion 202 above which a guide finger 203 is disposed for guiding the cam roller 201 downwardly into the cutaway portion 202 and pivoting the carriage 198 about the hollow shaft 180 to lift the forward end thereof vertically.

Fixed to the upwardly extending portion of the support 186 (Figs. 4 and 5) is a material guide plate 210 which extends forwardly to the position 211 and has a plurality of spaced fingers 212 forming slots therebetween through which reciprocable material gripping members 213 extend, the upper surfaces of these members being normally positioned flush with the upper surface of the material guide 210. The material gripping members 213 are U-shaped in general contour and are mounted upon the upper ends of spring pressed plungers 215 which are disposed in cutaway portions in the carriage 198 at the downwardly projecting portions 199, the lower ends of the plungers extending through slots in the hollow shaft 180 and having rounded ends 216 receivable in recesses 217 of a lifting pin or cam 218. The slots in the hollow shaft 180 are of sufficient length to allow rotary movement thereof the required distance relative to the plungers 215. Springs 220 disposed concentric with the plungers 215 normally urge the material gripping members 213 downwardly into their normal position shown in Fig. 6. The upper extremities of the material gripping members are movable and rest upon springs 221 which serve as cushions when the material or paper from the rolls 23 and 24 is gripped between the material gripping members 213 and a gripping bar 225. The gripping bar 225 is fixed to the carriage 198 and extends upwardly and over the material gripping members 213, it being provided with a longitudinally extending groove 226 in its lower surface for receiving strips of paper when forced upwardly by the material gripping members.

The lifting cam 218 is slidably disposed in the hollow shaft 180 and has a rounded end 230 extending over the side member 190 and arranged to engage a one-way spring actuated latch cam 231 pivotally carried by a bracket 232 mounted upon the side member 190 and so formed that at the beginning of the forward movement of the carriage, as hereinafter described, the end 230 of the actuating plunger will engage the cam 231 and be moved inwardly to move the recesses 217 out of registration with the plunger 215 and move the material gripping members 213 upwardly into gripping positions. A downwardly projecting arm 233 integral with the actuating plunger 218 is moved with the actuating plunger into the path of a stationary cam 234, which is positioned to move the actuating plunger to the left (Fig. 6) and into its normal position as the carriage 198 reaches its foremost position. The latch cam 231 is so constructed that the lifting cam 218 may pass over it, moving the latch cam about its pivot, during its return to normal position.

At the forward end of the carriage 198 an inwardly grooved portion 237 is formed in which there is positioned a roller 238 rotatably mounted on conically headed bearings 239 and composed of spaced resilient flexible portions 240. The flexible members 240 are somewhat ball-shaped in general contour and have spacing members which are considerably smaller in diameter disposed therebetween. The bearings 239 are carried by the upper ends of arms 241 (Figs. 4 and 5) which are integral with a sleeve 242 rotatably mounted upon a pivot shaft 243, the ends of the latter being carried by lugs 244 integral with the carriage 198. A stop pin 245 projecting upwardly from one of the arms 241 limits the forward movement of the roller 238 and a spring 248 disposed concentric with a pin 249, which is connected to one of the arms 241, normally urges the roller 238 forwardly to engage the paper from the rolls 23 and 24 and hold it in intimate engagement with the arbor 32 when the carriage 198 is in the wrapping position shown in Fig. 5.

A tucking arm 255 is rotatably journaled in a bearing 256 and extends longitudinally in the grooved portion 237 of the carriage 198 and is positioned parallel to the axis of the roller 238 and the arbor 32. Arcuate shaped fingers 257 are formed on the tucking arm 255 at spaced positions so that when the tucking arm is rotated they will be moved through an arc to positions between the flexible members 240 of the roll 238. An arcuate movement is imparted to the outer portion of the tucking arm 255 in view of the fact that it is positioned eccentric with respect to its axis of rotation; that is, with respect to the axis of the portion journaled in the bearing 256 which is indicated at 258. Teeth 259 formed in a periphery of the portion 258 interengage teeth 260 of a rack 261, the rack being slidably disposed in a groove 262 in the carriage 198. The rack 261 extends rearwardly and has a slot 265 disposed in the outer end thereof (Fig. 4) into which extends the reduced end of a pin 266 which operatively connects the rack 261 to a lever 267, the pin being disposed in a slot 268 of the lever. The lever 267 is fixedly mounted upon the hollow shaft 180 and is actuated to impart longitudinal movement to the rack 261 when the hollow shaft is rotated.

To condition the wrapping unit 172 for operation, the paper from the rolls 23 and 24 are fed over their respective idler roller 32, over the material guide plate 210, beneath the gripping bar 225 and a resilient tensioning element 270 (Fig. 4) until the forward edges of each strip of paper will terminate at the forward edge of the carriage 198.

The general operation of the entire machine will be described at the completion of the description of the construction thereof, but in order to more clearly understand the various units, a brief description of the operation thereof will be given at the termination of the description of their construction.

Upon considering briefly the operation of the wrapping unit 172, let it be assumed that the winding arbor 32 is rotating at its low speed, that is, its normal speed during the feeding operations, the rotation of the arbor being in a counterclockwise direction, and that the pawl 94 (Fig. 1) is moved into engagement with its clutch member 89 to rotate the cam shaft 165 (Fig. 3). During the rotation of the cam shaft 165, the cam 168 will be moved in a counterclockwise direction and as the roller 170 rides upon the high portion of the cam the lever 173 will be rocked in a clockwise direction, allowing the actuating arm 177 to be moved in the same direction by a spring 273 (Fig. 12) which is disposed concentric with the shaft 174. The actuating arm 177 moving in a clockwise direction will move the carriage 198 forwardly and at the beginning of the forward movement of the carriage the actuating plunger 218 is moved to the right (Fig. 6) by the cam 231, lifting the gripping members 213 to cause a gripping of the strips of paper by forcing portions thereof into the groove 226 of the gripping bar 225 so as to move the strips of paper forwardly with the carriage. The carriage is moved forwardly with the strips of paper until the roller 201 engages the guide finger 203 at which position the lifting cam 218 is moved into its normal position by the stationary cam 234 engaging the projecting arm 233 thus releasing the paper. The grooved portion 237 of the carriage will then be positioned beneath the arbor 32, and as the roller 201 is moved downwardly into the cutaway portion 202 (Fig. 5) the carriage will be moved upwardly about the hollow shaft 180 in a counterclockwise direction to the position shown in Fig. 5.

When the carriage reaches this position the strips of paper extend over the roll 238 beneath the arbor 32 and over the tucking arm 255. The carriage has reached its foremost and uppermost position, but a further movement is imparted to the actuating arm 177 which movement causes a rotation of the hollow shaft 180. The stop member 193 limits the forward movement of the carriage 198 and acts as a guide for the annular flange 195 as it moves into the annular groove 192 (Fig. 10) during the further movement of the actuating arm 177 so as to rotate a hollow shaft 180. Rotation of the hollow shaft 180 swings the lever 167 in a clockwise direction, imparting movement to the rack 261, which in turn rotates the tucking arm 255 causing the fingers 257 thereof to move around the arbor (Fig. 9), with the strips of paper, tucking them between the portions of paper extending over the roll 238 and the arbor so that the strips of paper will be frictionally secured to and will continue to be wound upon the arbor during its rotation. The length of time required for tucking the strips of paper in place upon the arbor is very short, therefore, the formation of the cam 168 is such that the tucking fingers 257 are moved into and immediately out of tucking positions, the flexible members 240 of the roller 238 cooperating to form a gripping means with the arbor during the tucking operation.

After the tucking operation has been completed, the wrapping unit is returned to its normal position where it remains until the condenser has been completed and ejected from the machine.

An upper feed table, indicated generally at 275, is substantially identical in construction to a lower feed table 276, with the exception of their respective moving means and for this reason detailed views of the upper feed table are shown and a general description of the upper feed table will apply equally well to the lower feed table.

As shown in Fig. 1 and Figs. 11 to 15, inclusive, the upper feed table 275 consists of a reciprocable support 277 slidably mounted upon transversely extending parallel bars 278 (both shown in Fig. 12), rigidly supported at their upper ends by the frame 21 and at their lower ends by a vertical frame 187 (Figs. 3 and 11).

The reciprocable support 277 extends laterally beyond the paths of each set of paper and foil for each condenser to be wound, but in view of the fact that both the upper feed tables are substantially identical in construction it is only believed necessary to show and describe one of these upper feed tables. As shown in Fig. 14, the support 277 has spaced recesses 290 in its upper surface for receiving spaced guide strips 291 which serve to form a table over which strips of paper from the rolls 25 and 26 and foil from the roll 29 passes. A cover plate 292 is fixed to the upper surface of the support 277 and over the guide strips 291 (Fig. 14). Other recesses 293 are formed in the upper surface of the support 277 for slidably receiving material guide fingers 294, which are held in frictional engagement with the under surface of the cover plate 292 by spring pressed plungers 295. The upper ends of the material guide fingers 294 are bent at right angles, as indicated at 296 (Fig. 15), which bent portions are arranged to be engaged by the adjacent edge of the support 277 while the lower ends of the material guide fingers are slidably disposed in apertures 297 in the vertical frame 187 and have fixed to their upper surfaces resilient elements 298 (Fig. 15), the resiliency of which tends to guide the strips of paper and foil in their movement toward the arbor.

Mounted upon the support 277 are bearings 300 (Figs. 12 to 16, inclusive) in which are rotatably journaled the ends of a shaft 301. The shaft 301 is also journaled in a bearing 302 which is positioned between the bearings 300 and fixed to the support 277. A collar 303 is disposed concentric with the shaft 301, to which it is fixed and has an aperture 304 therein for receiving one end of a torsion spring 305, which is also disposed concentric with the shaft 301 and has its other end disposed in an aperture in the bearing 302. A U-shaped rocking member 307 has its projecting arms positioned upon each side of the bearings 300, these arms being apertured to receive the shaft 301 to which it is rigidly secured. One of the arms of the U-shaped member, which is indicated at 308, has a lug 309 extending laterally therefrom and provided with a flat upper surface into engagement with which a latch 310 (Figs. 15 and 16) is urged by means of a spring 311 when the reciprocable U-shaped member 307 is moved into what might be termed its open or inoperative position. The latch 310 is pivoted at 312 and has a downwardly projecting arm 313 carrying a rod 314 at its lower end, which extends across to the latch 310 of the other upper feed table (as shown in Fig. 14). A roller 315 (Fig. 14) is positioned at the center of the rod 314 for a purpose hereinafter described.

In the forward portion of the U-shaped rocking member 307 is disposed a pivot rod 319 held against rotation by means of a screw 320 and extending to the left through a pad controlling element 321 and through gripping pads 322, which are disposed at spaced positions in cutaway portions of the pad controlling element. The gripping pads 322 carry friction elements 323 at their lower edges, these elements being formed of any suitable material, such as rubber, and arranged to engage the material extening over the cover plate 292 (Fig. 14) to firmly hold the material against movement when the gripping pads are in their gripping or operative position shown in Figs. 14 and 15. Resilient members 324 carried by the gripping pads 322 and having their upper ends engaging the pad controlling element 321 normally hold the gripping pads in their proper relative positions with respect to the controlling element 321, yet permit movement relative thereto to prevent damage to the material, that is the foil from the roll 29 and the paper from the rolls 25 and 26.

A hand lever 327 is mounted upon the outer end of the controlling element 321 for manually actuating the controlling element at desired times, such as when originally feeding the paper or foil to the machine. Means is provided for holding the controlling element 321 in its normal position, which means is adapted to hold the controlling element in an open position when moved by the hand lever 327. This means consists of a lever 328 fixed to the inner end of the controlling element 321 and having its outer end pivotally connected to a spring actuated plunger 329 so arranged that it will hold the controlling element in its normal position or in its manually actuated posiiton.

The U-shaped member 307 is recessed at 331 to receive a resetting pawl 332 when the feed table reaches its lowermost position during the feeding of the material from the rolls 25, 26 and 29 to the arbor. The resetting pawl 332 is pivotally mounted at 333 upon a bracket 334 and extends downwardly so that the lower end thereof is positioned to abut a lug 335 carried by the vertical frame 187. A pin 236 carried by the bracket 334 limits the movement of the resetting pawl 332 in a counterclockwise direction.

The upper feed table is moved into and held in its uppermost position by a spring 340 (Fig. 1), one end of which is fixed to a lug 341 carried by the vertical frame 21 and the other end is fixed to a chain 342, which extends over a sprocket wheel 343 (Figs. 1 and 11) and secured to the support 277. The mechanism for moving the upper feed table 275 downwardly to feed the material from the rolls 25, 26 and 29 to the arbor consists of a vertical rod 350 slidable in a bearing 351 and operatively connected at its upper end by means of a link 352 to the support 277 and at its lower end by means of a link 353 to a cam arm 354. The cam arm 354 is pivoted at 355 and carries at its lower end a cam roller 356 which is held in engagement with the cam 166 by means of a spring 357.

Prior to the actuation of the cam 166 for moving the upper feed table 275 downwardly, the latch 310 is released allowing the torsion spring 305 to swing the rocking member 307 and the feed pads 322 downwardly until the friction elements 323 thereof engage the material positioned therebeneath. The means for releasing the latch 310 at a predetermined time consists of a vertically movable plunger 360 slidable in a vertically apertured bracket 361 and having a tapered surface 362 positioned to engage the roller 315 of the latch (Fig. 11). The lower end of the plunger 360 carries a pin 363 receivable in a slotted end of a rocking lever 364 which is pivoted at 365 and has its other end operatively connected to a reciprocable cutting unit, indicated generally at 366, by a similar pin and slot connection. When one set of condensers has been wound, the paper and foil is cut by the cutting unit 366 in a manner hereinafter described, and during the actuation of the cutting unit the plunger 360 is moved upwardly to release the latch 310 to condition the upper feed table to feed material from the upper rolls 25, 26 and 29 when the cam shaft 165 is rotated.

The lower feed table 276 is shown in its normal position in Fig. 11 and is actuated by the cam 169 which is operatively connected to the support 277 of the lower feed table by a cam lever 370 and a link 371. The cam lever 370 is pivoted at 372 and has a transversely extending arm 373, the outer end of which is fixed to a spring 374 which constantly holds a cam roller 375, carried by the lower end of the cam lever 370, in engagement with the peripheral surface of the cam 169. The general contour of the cam 169 is such that the lower feed table is first moved to the left (Fig. 11) when the roller 375 rides upon the low portion 377 of the cam 169 until the latch 310 thereof engages an adjustable stop 378 to release the U-shaped reciprocable member 307 thereof and allow the gripping pads 322 of the lower feed table to be moved by the portion spring 305 thereof into gripping engagement with the foil from the roll 28. The lower feed table is then moved from its rearmost position to its foremost position as the roller 375 rides over the high portion 379 of the cam 169 to feed the foil to the arbor. Just before the lower feed table completes its forward movement, the resetting pawl 332 of the lower feed table engages an adjustable stop member 380 to move the U-shaped rocking member 307 thereof about its shaft 301 until it is in its open or inoperative position held by the latch 310. The lower feed table is then moved rearwardly to the position shown in Fig. 11 as the cam roller 375 rides downwardly upon the intermediate portion 382 of the cam 169.

The cutting unit 366 consists of horizontally disposed cutting knives one of which may be termed an upper cutting knife 385, and the other a lower cutting knife 386, both of which are secured to a bracket 387 mounted upon the upper ends of vertically movable spaced rods 388. The rods 388 are slidably mounted in suitable bearings 389 and 390 but one of the rods has disposed concentric therewith a spring 391 engaging the bearing 389 at its upper end and a collar 392 at its lower end, the latter being fixed to the rod so that the spring will normally urge the cutting unit 366 downwardly. Therefore, the spring 391 is the means for actuating the cutting unit 366 but is controlled by the cam 167.

Carried by the cutting unit 366 is a spring pressed pad or foil clamp 383 which is limited in its downward movement relative to the lower cutting knife 386 by pins 384 which are carried by the foil clamp and extend through elongated slots in the cutting unit where they rest upon the upper edge of the lower cutting knife. When the cutting unit 366 is in its normal position (Fig. 3) the foil clamp 383 is positioned above the path of the foil from roll 28 but during the downward or cutting stroke of the cutting unit the foil clamp moves the foil into engagement with a stationary abutment 393 where the foil is firmly held during the cutting operation to insure a clean cut and to avoid short circuiting in the finished condenser. A flat air nozzle 394 (Fig. 3) is connected to an air supply (not shown) and is positioned to direct a jet of air between the foil and the abutment 393 to lift and float the foil after the cutting operation so that it may be subsequently fed to the arbor. The air nozzle 394 also prevents the paper from the rolls 23 and 24 from sticking to the under surface of the abutment 393.

As shown in Fig. 11 the cam 167 has two drop portions, one of which may be termed the first drop portion 395 and the other a second drop portion 396 connected by an arcuate surface of equal radii, the second drop 396 being lower than the first. A cam lever 397 pivoted at 398 and having its forward end 399 positioned in engagement with the lower end of the spring actuated rod 388 carries a cam engaging finger 400 which rides upon the peripheral surface of the cam 167 and is normally positioned as shown in Fig. 11 adjacent the first drop portion 395. The knives 385 and 386 extend over the paths of the material as shown in Fig. 11 and are so positioned that when the cam 167 is rotated in a counterclockwise direction the cutting unit 366 will be dropped a sufficient distance by the cam engaging finger 400 moving downwardly into the first drop portion 395 to cause the knife 385 to move its serrated cutting edge shown in Fig. 12 through the foil from the roll 29 and the paper from the rolls 25 and 26. This movement of the cutting unit 366 will also move the serrated cutting edge of the cutting knife 386 through the foil from the roll 28 but not through the paper from the rolls 23 and 24. The lapse of time between the cutting of the two strips of foil and the paper from the rolls 25 and 26 is sufficient to allow additional windings of the paper from the lower rolls 23 and 24 to be made upon the arbor, to serve as a protective cover or wrapping for the condenser. This takes place during the rotative distance of the cam 167 from the first drop portion 395 to the second drop portion 396. When the second drop portion 396 of the cam 167 passes beneath the cam engaging finger 400, the cutting unit 366 will be moved downwardly a further distance by the spring 391 causing the lower knife 386 to sever the paper from the rolls 23 and 24. After the cutting operations have been completed, the cutting unit 366 is moved upwardly by the cam 167 so that it will be out of the way during the subsequent feeding operations.

When the condenser is half wound upon the arbor, terminals are automatically inserted in predetermined positions relative to the arbor, the mechanism for inserting the terminals being shown in Fig. 2 and Figs. 20 to 36, inclusive. The driving mechanism previously described is operatively connected to the terminal feeding mechanism, attention being directed to Fig. 2 wherein the shaft 64 is shown extending through the housing 61 and journaled in a bearing 410. Adjacent the bearing 410 and mounted upon the shaft 64 is a pinion 411 which interengages a gear 412 mounted upon one end of a continuously rotating shaft 413 (Fig. 34), which extends to the left through a hollow shaft 414 in which it is rotatably disposed. The shaft 413 also extends through a clutch collar 415 and has a clutch element 416 fixed to the outer end thereof. The clutch element 416 has disposed in apertures therein a plurality of spring actuated plungers 417 extending toward the clutch collar 415 and receivable in slots 418 equally spaced in the outer end of the clutch collar. The inner portion of the clutch collar 415 is tubular in general contour and is journaled in a bearing 419 where it is operatively connected to the hollow shaft by a tongue and slot connection shown in cross-section in Fig. 35, so as to permit relative movement of the clutch collar and maintain an operative connection with the hollow shaft. The clutch collar 415 and its association with the clutch element 416 may be termed a one revolution clutch, the clutch collar having a lug 422 (Fig. 2) receivable in a groove 423 where it is positioned until the clutch is actuated for setting the terminal feed mechanism in operation. The means for moving the clutch collar 415 outwardly to close the clutch and operatively connect the hollow shaft 414 to the solid shaft 413 consists of an electromagnet 424 controlled through the counting mechanism 105 (Fig. 19) for moving an armature 425 about its pivot 426 against the tension of a spring 427 to move a yoke 428 in a clockwise direction, due to the connecting link 429, to move the clutch collar 415 to the left (Fig. 2). The yoke 428 is pivotally supported at 430 and has inwardly projecting pins receivable in a peripheral groove of the clutch collar for effecting an operative connection therewith. The electromagnet 424 remains energized but a short time which is sufficient to close the clutch; that is, to move the clutch collar 415 outwardly, and as soon as this takes place the lug 422 will ride upon the adjacent surface of the bearing 419 retaining the operative connection of the clutch collar and clutch element until they complete one revolution, at which time the lug will again enter the groove 423, resulting in a disengagement of the clutch and the stopping of rotation of the hollow shaft 414.

The hollow shaft 414 may be termed as a cam shaft in that two groups of cams are mounted thereupon the group at the left (Fig. 2) constituting the feed finger actuating cams and the group at the right constituting the magazine actuating cams. The magazine actuating cams are indicated at 435, 436, 437 and 438. The cam 436 and its cooperating cam 438 are shown in Fig. 21 and have respectively disposed in engagement with their peripheral surfaces rollers 440 and 441. These rollers are rotatably carried by arms of an actuating lever 442 rotatably mounted upon a pivot rod 443 and having its upper arm operatively connected to a reciprocable terminal feed table 444, the ends of which are dovetailed in general formation and slidably disposed in dovetailed slots 445 (Fig. 24). Extending upwardly from the reciprocable table 444 are spaced terminal ejecting members 446 normally positioned in grooves of a supporting frame 447 and having push plates 448 secured thereto, as shown in Figs. 21 and 24. These push plates extend upwardly above the upper surfaces of the ejecting members 446 for a distance slightly less than the thickness of each of the terminals, indicated at 449, so that during each movement of the table 444 to the left (Fig. 21) a single terminal will be moved from beneath the stack of terminals. The stack of terminals are disposed in a magazine 455 rigidly mounted upon a supporting bracket 456 (Fig. 2) which has bearings 457 and 458 for the hollow cam shaft 414 in addition to the bearing 419 previously described. The bearings 419, 457 and 458 are apertured to journal the pivot rod 433. Forwardly extending end walls 460 of the magazine (Fig. 25) have overlapping plates 461 secured thereto forming vertical recesses, U-shaped in cross-section, in the magazine for receiving the ends of the terminals as shown in Figs. 24 and 25 for holding them in stacked formation, the terminals resting upon a horizontally extending base 462 which is flush with the upper surfaces of the ejecting members 446. The magazine 455 is recessed at spaced positions for receiving retaining members 464 which are normally urged downwardly by springs 465 and have tapered lower surfaces 466. The rearmost edge of each of the retaining members 464 engages the base 462 upon each side of a recess 467 disposed in the base for receiving each of the ejecting members 446, while the forward edge of each ejecting member extends above the supporting base a distance sufficient to permit the lowermost terminal to be moved therebeneath but which will hold the other terminals against movement during the ejecting operation. The terminals in the stack are constantly forced downwardly by a weight member 468 during the ejecting operation, which is freely movable in the magazine with its ends disposed in the U-shaped recesses and resting upon the stack of terminals.

A vertically movable element 472 has formed thereon terminal receiving platforms 473 and 474 which may respectively be termed an upper platform and a lower platform. The element 472 has tongue members 475 slidably receivable in grooves 476 in the end walls of the magazine 455 so that the platforms 473 and 474 may be positioned to receive terminals moved thereupon by the ejecting members 446 during the actuation of the cams 436 and 438. Vertical movement is imparted to the element 472 by the rocking of a cam lever 480 caused by the actuation of the cams 435 and 437. As shown in Fig. 22 the cam lever 480 has one arm operatively connected at 481 to the vertically movable element 472, this arm also carrying a cam roller 482 which rides upon the peripheral surface of the cam 435 while the other arm of the lever carries a roller 483 which rides upon the peripheral surface of the cooperating cam 437. The cam lever 480 is rotatably mounted upon the pivot rod 443 and when actuated by the cams 435 and 437, moves the element 472 downwardly so that the upper platform 473 is moved from its normal position shown in Figs. 21 and 22 to a position to receive the first terminal ejected from the bottom of the stack after which the element 472 will be moved upwardly to its normal position where the lower platform 474 will be positioned to receive the next terminal ejected from the bottom of the stack. Recesses are provided in the element 472 and extend into the platforms 473 and 474 as indicated at 486 for permitting the ejecting members 446 to move to the left sufficient distances during each ejecting operation to move the terminals upon the platforms. The terminals are held upon these platforms by vacuum created in passageways 487 and communicating surface ports 488 by suitable means (not shown) for holding the terminals in place until they are to be removed by the terminal feed mechanism hereinafter described. A further means (not shown) is provided for removing the vacuum from the terminals upon the platforms 473 and 474 and for applying air under pressure to the terminals through the passageways 487 and the surface ports 488 to free the terminals from the platforms at the time when they are to be received by the terminal feed mechanism.

A flexible tube 490 (Figs. 2, 24 and 25) has one end disposed in communication with the passageways 487 and the other end disposed in communication with a valve (not shown) for alternately connecting the tube with a vacuum supply and an air pressure supply.

The terminals 449, which are placed upon the platforms 473 and 474, are picked up by terminal feed fingers 495 and 496 when the feed fingers are positioned above their respective platform and at the time the vacuum to the platforms is released and air under pressure applied. The feed fingers 495 and 496 are disposed in parallel relation and have their left ends rigidly carried by oscillating arms 497 and 498, respectively. Each of the feed fingers has passageways 499 therein which extend horizontally through the fingers and downwardly through the arms 497 and 498, (as shown in Figs. 28, 29 and 30) where they communicate with tubes 500 leading to a vacuum supply (not shown), so that there will be a constant vacuum in the passageway 499 of each feed finger. The lower surface of each feed finger is apertured at 501 at spaced positions adjacent the forward edges thereof, these apertures communicating with the passageway 499, so that the vacuum may serve as a holding means for the terminals 449 received from the platforms 473 and 474. Laterally extending slots 505 are disposed in the lower surface of each of the feed fingers at spaced positions (Fig. 27) for receiving upwardly projecting tongue portions 506 of ejecting fingers 507. The forward edges of the ejecting fingers 507 are normally positioned back of the apertures 501 of the feed fingers, as shown in Fig. 30, and adjacent the rear edge of a terminal when held by vacuum to the feed fingers. The ejecting fingers have their left ends (Fig. 27) fixed to arms 508, the lower ends of which are fixedly mounted upon shafts 509. The shafts 509 are rotatably disposed in hollow shafts 510, which are rotatably journaled in parallel apertures extending horizontally through a carriage 511. A sectional detailed view of this construction is shown in Fig. 29, which view is taken through the mechanism, for the upper feed finger 495 and is substantially identical to the mechanism for the feed finger 496.

Upon the left end of the hollow shaft 510 (Figs. 23 and 29) is mounted an arm 515 carrying an adjustable set screw 516 at an angle in its outer end which is arranged to abut a stop member 517 integral with the carriage 511 (Figs. 23 and 27) to limit the rotary movement of the arm. The outer end of the arm 515 has also a tubular portion 518 provided in its upper end with a spring adjusting member 519 and in its lower end with a spring 520, the latter extending downwardly and having its lower end receivable in a recessed portion of an arm 521 pinned to the solid shaft 509, as shown in Fig. 29. The spring 520 normally holds the arms 515 and 521 in the spaced positions (Fig. 23) and serves as a means for moving the arm 515, when movement is imparted to the arm 521, in a clockwise direction. An auxiliary spring 524 has its upward end connected to the arm 515 and its lower end connected to a lug integral with the carriage 511 for moving the arm 515 counterclockwise into its normal position while the arm 521 is being returned to its normal position. The means for actuating the arm 521 consists of a pinion 525 mounted upon the left end of the shaft 509 (Figs. 20, 23 and 29), which interengages the teeth of a gear segment 526 rotatably mounted at 527 and having a transversely extending arm 528 provided with an adjustable lever engaging element 529 positioned to engage a cam lever 530. The cam lever 530 is rotatably mounted upon pivot rod 443 (Fig. 23) and carries rollers 534 and 535, which respectively engage peripheral surfaces of cams 536 and 537. The cams 536 and 537 are mounted upon and keyed to the hollow cam shaft 414 (Figs. 2, 20, 23 and 24) and are actuated during the rotation thereof.

A similar means is provided for actuating the lower feed finger 496 and its ejecting finger 507. This means consists of an arm 540 fixedly mounted upon the hollow shaft 510 of the lower feed finger mechanism, extending downwardly and provided with a cup-shaped member 541 at its lower end arranged to receive one end of a spring 542, the tension of which may be varied by a screw 543. The other end of the spring 542 is disposed in a recess in an arm 544, which is mounted upon and fixed to the solid shaft 509 of the lower feed finger mechanism. Fixed to the adjacent end of the solid shaft 509 of this mechanism is a pinion 545, the teeth of which interengage the teeth of a gear segment 546 suitably mounted at 547 and having a transversely extending arm 548. An adjustable screw 549 is carried by the outer end of the arm 548 and is positioned to engage a cam lever 550, which is rotatably mounted upon the pivot rod 443 and rotatably carries cam rollers 552 and 553. The cam rollers 552 and 553 respectively engage peripheral surfaces of cams 554 and 555, which are mounted upon and keyed to the hollow cam shaft 414 (Figs. 2 and 20). A tension spring 557 has one end fixed to a projection 558 of the arm 540, whereas the other end thereof is fixed to the carriage 511 similarly to the connection of the spring 524 (Fig. 23).

The carriage 511 is mounted for movement upon parallel rods 565 rigidly mounted at their ends. Means for moving the carriage consists of a piston 566 slidably disposed in a cylinder 567 and having piston heads 568 and 569 (Figs. 2 and 27). A piston rod 570, slightly smaller in diameter than the inner diameter of the cylinder 567, has a reduced portion 571, which extends through the heads 568 and 569, as well as the piston 566, to which it is secured thereto. The piston rod 570 extends to the left through the cylinder 567, through a seal or packing gland 572, and is connected to the carriage 511 at a position between the rods 565. Air at a predetermined pressure is supplied to the cylinder 567 in any suitable manner and at all times against the piston head 568 to normally urge the piston 566 into its position at the extreme right of the cylinder, which will normally position the feed fingers 495 and 496 in their positions, shown in Fig. 2, ready to feed terminals to the condenser being wound. The size of the piston rod 570 limits the effective pressure of the air against the piston head 568. Therefore, when air under the same pressure which is applied to the piston head 568 is applied to the piston head 569 through a passageway 575, the piston 566 will be moved to the left to move the feed fingers 495 and 496 to positions above their respective platforms 473 and 474.

The feed fingers remain at the position shown in Fig. 2 ready to insert their terminals in the windings of the condenser; and while the feed fingers are being actuated during the actuation of the hollow cam shaft 414, an additional set of terminals is moved upon the platforms 473 and 474. While the feed fingers are in their normal or feeding position, the arms 528 and 548 are positioned above their respective cam levers 530 and 550 so that when the clutch members 415 and 416 are engaged, the cams 536, 537, 554 and 555 will actuate the feed fingers. The arrangement of the cams is such that the lower feed finger will be actuated first to insert its terminal in the windings of the condenser and is immediately followed by the actuation of the upper feed finger. During the actuation of the cams 554 and 555, the cam lever 550 is moved in a clockwise direction about its pivot 551, moving the arm 548 in a counterclockwise direction above its pivot 547, thus imparting a clockwise rotation to the solid shaft 509 of the lower feed finger mechanism. This rotation of the shaft 509 imparts a similar movement to the arm 544 and through the force of the spring 542, the arm 540 is moved in a clockwise direction, moving with it the hollow shaft 510. Therefore, the lower feed finger 496 and its ejected finger 507 is swung downwardly to an ejecting position adjacent the arbor 32. When the lower feed finger reaches this position, the arm 540 will engage an adjustable stop 580, stopping the movement of the lower feed finger. However, the cam 554 has not completed its effective movement of the cam lever 550 but continues the movement thereof a sufficient distance to move the arm 544 against the force of the spring 542 to rotate the solid shaft 509 thereof a further distance than the rotation of the hollow shaft 510, causing a movement of the ejecting finger 507 relative to the lower feed finger 496 to move the terminal 449 carried by the lower feed finger out of registration with the vacuum ports 501, and between the convolutions of paper and foil.

When the lower feed finger has disposed of its terminal, the upper feed finger is actuated through the actuation of the cam lever 530, the counterclockwise rotation of the arm 528 and its gear segment 526, the clockwise rotation of the pinion 525 with the solid shaft 509 and the arm 521, causing a clockwise rotation of the arm 515 and the hollow shaft 510, through the force of the spring 520, until the adjustable screw 515 engages the stop 517, at which time the upper feed finger is stopped in its forward movement. The movement of the arm 521 is continued against the force of the spring 520, causing a movement of the ejecting finger 507 relative to the upper feed finger 595, moving the terminal 449 out of registration with the vacuum ports 501 and between the convolutions of paper and foil. The lower feed finger deposits its terminal in engagement with the foil from the roll 28, whereas the upper feed finger deposits its terminal in engagement with the foil of the roll 29.

In Fig. 31 the feed fingers are shown in their normal positions, in Fig. 32 the lower feed finger is shown in its operative or feeding position while the upper feed finger remains in its inoperative position, and Fig. 33 illustrates the feed fingers at the completion of the feeding operations. After the feeding operations have been completed the cams 536, 537, 554 and 555 will permit the cooperating feed finger actuating mechanism to return to their normal positions by the force of the springs 524 and 557 aided by the springs 520 and 542. The springs 520 and 542 move their respective arms pretermined distances away from each other to move the ejecting fingers 507 relative to their respective feed fingers 495 and 496 until projecting lugs 582 of the ejecting fingers engage integral stops 583 of the arms 497 and 498 (Figs. 31, 32 and 33).

Figure 38:
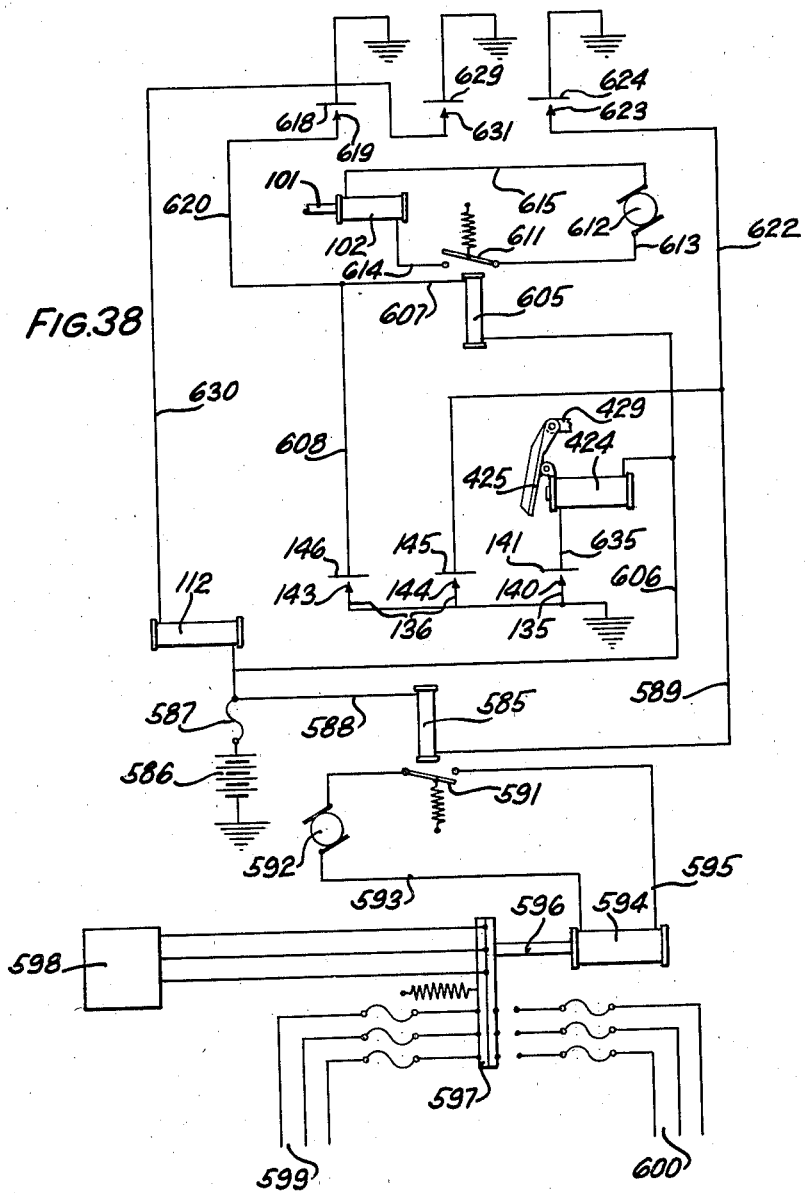
Fig. 38 is a wiring diagram illustrating a feature of the invention.

Referring now to the wiring diagram (Fig. 38) in conjunction with Figs. 2, 12, 18, 19, 34 and 36, the various electrical circuits will be described. Upon the energization of the electromagnet 112, the circular member 130 and contacting arms 135 and 136 are rotated by means of the shaft 125 and iron collar 127. During the rotation of the circular member and its contact arms, contact 144 of the contact arm 136 will engage the contact 145 completing a circuit through a relay 585, which is established from a source of current, such as a grounded battery 586, through a fuse 587, conductor 588, the winding of the relay 585, conductor 589, contact 145 and contact 144 to ground. The energization of the relay 585 operates its armature 591 to complete a circuit from a source of electrical power 592, through armature 591, conductor 593, the winding of a solenoid 594, conductor 595 to the power source 529, whereby a core 596 of the solenoid 594 actuates a switch 597 to disconnect the power means for the winding machine, such as a motor 598 from a 440 volt, 60 cycle power line 599, and connect it to a 110 volt, 15 cycle power line 600, to thus decrease the speed of the motor 598 of the winding machine, which, of course, decreases the speed of rotation of the winding arbor 32.

Subsequent to the reduction in speed of the winding machine through the reduction of the speed of the motor 598, contact 143 of the contacting arm 136 engages contact 146 to complete an energizing circuit for a relay 605 to effect the actuation of the solenoid 102 (Figs. 18 and 38) to operate the one revolution clutch 89—94 to thereby accomplish the driving of the cam shaft 165 through one complete revolution. The energizing circuit for the relay 605 is traced from grounded battery 586 through fuse 587, conductor 606, the winding of a relay 605, conductors 607 and 608, contacts 146 and 143 to ground. The energized relay 605 attracts its armature 611 to establish a circuit from a source of power 612, through conductor 613, relay armature 611, conductor 614, the winding of the solenoid 102, conductor 615 to the power source 612. Energization of the solenoid 102 attracts its core 101 to rock counterclockwise the latch 95 (Figs. 1 and 18) connected therewith through a link 100 to release the pawl or clutch element 94 to effect the closing of the clutch that is the engagement of the clutch element 94 with the clutch member or sprocket wheel 89 to cause rotation of the cam shaft 165.

Rotation of the cam shaft 165 brings a contact 618 (Figs. 12 and 38) carried thereby into engagement with a terminal 619 to establish a locking circuit for the relay 605 to maintain the one revolution clutch 89—94 operatively engaged to thus assure rotation of the cam shaft 165 for one complete revolution. This locking circuit is traced from grounded battery 586 through fuse 587, conductor 606, a winding of the relay 605, conductor 607 through a conductor 620, terminal 619, cam contact 618 to ground. At the same time a locking circuit is completed for the relay 585 to keep the winding machine motor 598 operating at a low speed during the rotation of the cam shaft 165, which effects the various feeding operations of the paper and foil to the winding arbor 32. The locking circuit for the relay 585 is traced from grounded battery 586, through fuse 587, conductor 588, the winding of the relay 585, conductor 589, through a conductor 622, a terminal 623, a cam contact 624, to ground.

As the cam shaft 165 has completed one revolution, the terminal 619 engages an insulated portion of the cam contact 618 to discontinue the locking circuit for relay 605, allowing the spring 99 (Fig. 18) to pull the latch clockwise into the path of rotation of the pawl or clutch element 94 to disconnect the one revolution clutch and stop the rotation of the cam shaft 165. Just prior to the discontinuance of the rotation of the cam shaft 165, the terminal 623 engages an insulated portion of the cam contact 624 whereby the locking circuit for the relay 585 is opened to cause the deenergization of the solenoid 594, and the switch of the motor 598 is moved from the 110 volt power line 600 to the 440 volt power line 599 to cause an increase in speed of the arbor 32 during the winding operation.

When the cam shaft 165 completes its one revolution for actuating the cutting knives and the units for feeding paper and foil to the arbor 32 for the next condenser to be wound, a cam contact 629 (Figs. 12 and 38) carried by the cam shaft 165 is designed to complete a circuit from grounded battery 586, through fuse 587, the electromagnet 112 through a conductor 630, a terminal 631, cam contact 629 to ground to thus energize the electromagnet 112 and thus operate the counting mechanism 105. This circuit remains closed during the idle period of the cam shaft 165 and is opened when rotation of the cam shaft is again started. The deenergization of the electromagnet 112 permits the energy stored in the torsion spring 131 (Fig. 19) to return the circular member 130 and its contact arms 135 and 136 to the zero position where a stop 633 secured to the underside of the circular member 130 engages a stop pin 634 projecting from the upper side of the cover plate of the counting mechanism. This construction for returning the counting mechanism to the zero or starting point when the particular type of condenser being wound comprises a smaller number of turns and paper and foil than the counting mechanism indicates in one revolution of its contacting arms 135 and 136, saves the time that would otherwise be required to operate idly the machine until the counting mechanism registers zero.

At substantially the halfway point in the number of turns of foil being wound on the arbor to form a condenser, the contact 140 of the arm 135 of the counting mechanism engages the contact 141 to establish a circuit to energize the electromagnet 424 (Figs. 2, 36 and 38) to actuate its armature 425 resulting in the closing of the clutch 415—416, to cause a one revolution of the hollow cam shaft 414 and with its cams for actuating the feed fingers 495 and 496 to insert terminals between the convolutions of foil and paper upon the arbor, and to actuate the cams for the terminal ejecting mechanism to position terminals upon the platforms 473 and 474 where they may be picked up by the feed fingers. This energizing circuit for the electromagnet 424 is traced from the grounded battery 586 through fuse 587, conductor 606, the winding of the electromagnet 424, conductor 635, contact 141, terminal 140 to ground.

Upon completion of the winding of one condenser an ejector mechanism (Fig. 37) is actuated to remove the condenser from the arbor 32. It will be understood that a similar ejecting mechanism is provided for each arbor, but as the description thus far has been concentrated to one side of the winding machine, only one ejecting mechanism will be described, which description will apply equally well to the other ejecting mechanism. The ejecting mechanism includes a bracket 640 U-shaped in general contour and on which is mounted a cylinder 641 having a piston 642 which carries a reciprocable element 643 slidably mounted on guide rods 644, secured to and positioned between one end of the bracket 640 and the head of the cylinder 641. Pivoted at 647 on the reciprocable element 643 is a bell crank latch 648, the short arm of which is connected to the end of a spring 649 having the other end fastened to the reciprocable element so that the latch portion 650 is urged downwardly into a horizontal position. Slidably mounted upon and rotatable with the arbor 32 is an ejector collar 651 carrying a freely rotatable sleeve 652 which is mounted on a bifurcated lever 653 connected to a link 654 pivoted at 655 to the bracket 640. A spring 656 normally retains the collar 651 at the inner end of the winding arbor 32. Air at a predetermined pressure is admitted continuously to the cylinder 641 on the outer or left side of the piston head to return it in its farthest position to the right (Fig. 37) so that the latch 648 is caught on a pin 660 secured to the bifurcated lever 653, but when air at the same pressure is admitted to the inner or right side of the piston head, due to the larger effective area thereof, the piston is forced to the left. The movement of the piston to the left moves the latch 648, the lever 653 and the collar 651 to thereby eject the condenser from the arbor onto an arcuate plate 661 (Figs. 1, 20, 21, 22, 24, 25 and 26). When nearing the limit of the outer movement of the ejector collar, a roller 662 mounted on one side of the latch 648, engages a stationary cam 663 secured to the cylinder head whereby the latch is forced upwardly to release the bifurcated lever and allow the spring 656 to return the ejector collar and lever to their retracted positions. A valve (not shown) may be operated in timed relation to admit air under pressure to the inner or right end of the piston head 642, and as soon as this pressure is released the pressure upon the left of the piston head will force the piston to the right into its inoperative position shown in Fig. 37.

The operation of the winding machine is continuous, it being actuated at high speed during the general winding of the condenser and reduced in speed during the feeding of the paper and foil to the arbor in starting a new condenser and during the feeding of terminals thereto when the condenser is approximately half wound. To more clearly understand the operation of the winding machine, let it be assumed that the winding of one condenser is about completed, and that the solenoid 102 (Fig. 18) has just been energized to release the latch 95 and allow the clutch element 94 to engage the clutch member 89. The engagement of these clutch members operatively connects the cam shaft 165 with the power means or motor 598, which at this time is operating at a low speed from the 110 volt 15 cycle power line 599. The 4 cams 166 to 169 inclusive which are mounted upon the cam shaft 165 bring about four complete operations during the one revolution of the cam shaft, the first operation being the actuation of the cutting unit 366 (Figs. 11 and 12) through the rotation of the cam 167, allowing the spring 391 to move the cutting unit downwardly when the first drop portion 395 of the cam passes beneath the cam engaging finger 400 causing the cutting knives 385 to cut the foil from the roll 29 and the paper from the rolls 25 and 26 and causing the cutting knife 386 to cut the foil from the roll 28. During the first portion of the cutting operation the paper from the rolls 23 and 24 continue to be wound about the arbor to form an insulating cover or wrapping for the condenser which winding continues during the movement of the cam from the first drop portion 395 to the second drop portion 396. When the second drop portion 396 passes beneath the cam engaging finger 400, the strips of paper from the rolls 23 and 24 are severed and fastened in place by suitable means such as glue or other suitable material applied thereto from a glue pot or container 664 mounted upon the cutting unit and movable therewith as shown in Fig. 1. After the cutting operation has been completed, the cutting unit 366 is moved upwardly to its normal or inoperative position shown in Fig. 11 by the cam 167 during which time the wound container is ejected from the arbor.

The cam 168 begins its movement of the actuating arm 177 during the upward movement of the cutting unit, and during the movement of the actuating arm, which is in a clockwise direction (Fig. 3) to actuate the wrapping unit 172, the strips of paper from the rolls 23 and 24 are gripped between the gripping members 213, and the gripping bar 225 caused by the movement to the right of the actuating plunger 218 (Fig. 6) thus moving the strips of paper forwardly toward the arbor 32 during the forward movement of the carriage 198. Just before the carriage 198 reaches its foremost position, the cam roller 201 enters the cutaway portion 202 and swings the carriage in a counterclockwise direction to move the grooved portion 237 adjacent the arbor 32 where the strips of paper being fed will extend over the roller 238, beneath the arbor and upwardly and over the tucking arm 255. Therefore, the movement of the rack 261 to the right will cause a counterclockwise arcuate movement of the tucking arm about the arbor until the arcuate shaped fingers tuck the end of the strips of paper between the arbor and the portions of the strips passing over the roller 238 thus starting the winding of the first strips of paper upon the arbor. The wrapping unit 172 is returned to its normal or inoperative position in just the reverse order in which it was moved into its operative position. This completes the first wrapping or feeding operation and the second operation caused by the rotation of the cam shaft 165.

The second feeding operation is brought about by the operation of the cam 166 which actuates the cam lever 354 to move the rod 350 downwardly together with the link 352 and the upper feed table 275, the latch 310 thereof having been released by the vertically movable plunger 360 during the actuation of the cutting unit 366, allowing the gripping members 322 thereof to be moved downwardly so that the friction elements 323 will grip the foil from the roll 29 and the paper from the rolls 25 and 26. The downward and forward movement of the upper feed table 275 will move these strips of paper and foil downwardly until the edges thereof, guided by the material guide fingers 294, enter the convolutions of material upon the arbor 32. The material advanced by the upper feed table 275 is moved downwardly and forwardly at the same rate of speed at which the arbor is rotated, and when the upper feed table reaches the extent of its forward movement, the resetting latch 332 thereof will move the gripping members free of the material until the latch 310 is again moved into its holding position shown in Fig. 11, after which the upper feed table is returned to its upper or inoperative position.

The third feeding operation follows a second feeding operation so that there will be a protective margin of paper in advance of the foil from the roll 29. This operation is rendered effective by the actuation of the cam 169 which moves the lower feed table 276 rearwardly until the latch 310 thereof (Fig. 11) engages the adjustable stop 378 and has released the U-shaped member 307, causing the gripping members thereof to grip the foil from the roll 28 after which the lower feed table is moved forwardly at the same speed at which the paper from the rolls 23 and 24 are wound upon the arbor until the forward edge of the foil enters the convolutions of paper upon the arbor at which time the resetting pawl 332 will engage the stop 380 to move the gripping members of the lower feed table upwardly until the latch 310 may be moved into its holding position. After the resetting of the lower feed table it is returned to its normal position shown in Fig. 11.

All of these operations are completed during the one revolution of the cam shaft 165 and as soon as the cam shaft has completed its one revolution, the contact 629 (Figs. 12 and 38) upon the cam shaft engages its terminal 631 to complete the circuit through the electromagnet 112 to set in operation the counting mechanism 105.

Just prior to the completion of the one revolution of the cam shaft 165 the terminal 619 engages an insulated portion of the cam contact 618 to discontinue the locking circuit for the relay 605, thereby deenergizing the solenoid 102 (Figs. 18 and 38) and allowing the spring 99 (Fig. 18) to disengage the clutch members 94—89 to stop the rotation of the cam shaft. At the same time the terminal 623 engages the insulated portion of the cam contact 624 to open the locking circuit for the relay 585 and allowing the switch 597 to be moved from the 110 volt power line 600 to the 440 volt power line 599 causing the winding arbor to be rotated at its high speed during the winding operation.

The arbor 32 continues its rotation at high speed until the condenser being wound has received approximately half of its convolutions of material, at which time the contact 144 of the contact arm 136 will engage the contact 145 completing a circuit through the relay 585, which, when energized, will actuate its armature 591 to complete a circuit through the solenoid 594, the energization of which will actuate the switch 597 to disconnect the motor 598 from the 440 volt power line 599 and connect it to the 110 volt power line 600, again decreasing the speed of rotation of the winding arbor 32. Immediately following the reduction in speed of the winding arbor through the reduction of speed in the motor 598, the contact 140 of the contact arm 135 engages the contact 141 to establish a circuit to energize the electromagnet 424 (Figs. 2, 34 and 36) to actuate the armature 425 resulting in the closing of the clutch 415—416 to cause one complete revolution of the hollow cam shaft 414 with its cams for actuating feed fingers 495 and 496. When the hollow cam shaft 414 is rotated, the cams 536 and 537 rock the cam lever 530 in a counterclockwise direction (Fig. 23) to move the gear segment 526 in a counterclockwise direction, which, in turn, will rotate the pinion 525 and its solid shaft 509 in a clockwise direction, moving with it the arm 521 and, through the force of the spring 520, the arm 515 moving the lower feed finger 496 and its ejecting finger 507 simultaneously until the movement of the lower feed finger is stopped by the screw 516 engaging the stop member 517, after which the ejecting finger 507 will continue its movement to force the terminal 449 carried thereby free of the lower feed finger and between the foil from the roll 28 and the paper from the roll 26. Immediately following the actuation of the lower feed finger, the cams 554 and 555 will rock the cam lever 550 clockwise to rock the arm 548 counterclockwise and rotate a pinion 545 and its solid shaft 509 clockwise, together with the arm 544, which, through the force of the spring 542, will move the arm 540 clockwise, rotating the hollow shaft 510 in the same direction. The upper feed finger 495 with its ejecting finger 507 will thus be moved into the position shown in Fig. 33 where the upper feed finger will be limited in its movement by the stop 580 (Fig. 20). After the upper feed finger 495 is stopped in its forward movement by the stop 580, its ejecting finger 507 will continue in its forward movement until the terminal 449 carried by the upper feed finger is ejected therefrom and passed between the foil from the roller 29 and the paper from the roll 24. The feed fingers and their respective ejecting fingers are returned to their normal or upper positions ready to be moved to the loading positions above their respective platforms 473 and 474. Furthermore, the feed fingers are operated in such timed relation with respect to the rotation of the arbor 32 that one of the terminals being fed to the condenser will be positioned parallel with one side of the arbor, whereas the other terminal will be positioned parallel with another side of the arbor, so that a further winding of the condenser will not bend nor in any way cause harm to the terminals, which might occur if the terminals were inserted at the edges instead of the sides of the arbor and which might also cause harm to the foil adjacent the terminals.

As described in the foregoing, terminals are fed upon the platforms 473 and 474 during the actuation of the feed fingers for feeding terminals to the condensers being wound. The cams 435, 436, 437 and 438 are so formed that the element 472 with the platforms will first be moved downwardly until the platform 473 is in loading position; and immediately following this positioning of the upper platform, the ejecting members 446 are moved to the left (Fig. 21) to move the lowermost terminal 496 beneath the retaining members 464 and upon the upper platform 473 where the terminal will be held by vacuum. The platforms 473 and 474 begin their upward movement prior to the reverse movement of the ejecting members to lift the terminal therefrom. The ejecting members 446 are then returned to their normal positions shown in Fig. 21 where they engage the next terminal and move it to a position above the lower platform 474 as it reaches its loading position. The platforms continue their upward movement to move the lower platform 474 above loading position to remove the terminal from the ejecting fingers.

The feed fingers are moved to the loading positions above their respective platforms 473 and 474 by the actuation of the piston 566, after which the vacuum is cut off to the platforms and air under pressure applied, forcing the terminals disposed thereupon into engagement with the feed fingers, where the terminals are held during the return of the feed fingers to their normal positions ready for the feeding of the terminals to the next condenser. The loading of terminals upon the feed fingers takes place during the actuation of the cam shaft 165 for performing the cutting and feeding operations so that the feed fingers will be out of the way at this time. During this time the speed of the winding arbor 32 is decreased to its low speed for the actuation of the cutting unit 366, the sealing and ejecting of the condenser and for the actuation of the wrapping unit 172, the lower feed table 276 and the upper feed table 275 to start another condenser upon the arbor.

What is claimed is:

1. In a winding machine, a rotatable winding arbor, means for rotating the arbor, means for feeding material to the arbor, a tucking member movable in an arcuate path about the arbor for wrapping the forward end portion of the material entirely around the arbor, and a roller positioned to hold the material in close engagement with the arbor and cooperating with the tucking member in wrapping the material around the arbor.

2. In a material winding machine, a rotatable arbor, means for supplying material to the arbor, a material feeding member arranged to receive the material, means for actuating said material feeding member for advancing the material toward the arbor, said material feeding member including a tucking arm, and means for actuating the tucking arm for moving it about the arbor for wrapping the material thereon.

3. In a material winding machine, a rotatable winding arbor, means for supplying material to the arbor, a material feeding member mounted for movement toward and away from the arbor, means for moving the material feeding member toward the arbor, means actuated at the beginning of the movement of the material feeding member to grip the material to move the material toward the arbor, means for releasing the gripping means, and means carried by the material feeding member for wrapping the material around the arbor.

4. In a material winding machine, a rotatable arbor, means for supplying material to the arbor, a material feeding member, means for moving said material feeding member toward and away from the arbor, means for gripping the material during the movement of the material feeding member toward the arbor to move the material therewith, means for releasing the gripping means when the material feeding member has reached the end of its movement toward the arbor, a tucking arm movable about the arbor for wrapping the material thereon, and means actuated by the further movement of the material feeding member actuating means for actuating the tucking arm.

5. In a material winding machine, a rotatable arbor, means for supplying material to the arbor, a material feeding member movable in one direction relative to the arbor and movable in another direction to a position adjacent the arbor, means carried by the material feeding member for gripping the material during the movement thereof in the first mentioned direction and for releasing the material at the end of said movement, means for locking the material feeding member in its position adjacent the arbor, and means carried by the material feeding member for wrapping the material around the arbor.

6. In a material winding machine, a rotatable arbor, means for supplying material to the arbor, a material feeding member, means for moving said member toward the arbor to feed the material thereto during the rotation of the arbor, and a flexible element carried by said member for gripping the material during the feeding movement of said member, said flexible member being mounted at an acute angle whereby a backward pull on the material tends to increase the gripping action, but a forward pull on the material tends to release the gripping action.

7. In a material winding machine, a rotatable arbor, means for supplying material to the arbor during the rotation thereof, a flexible material feed member arranged to be moved into clamping engagement with the material, means for supporting the feed member so that it may move a limited distance, means for moving the feed member with the material toward the arbor until the forward edge of the material is received by the arbor, and means for moving the feed member free of the material, the feed member being movable by the material received by the arbor to relieve the clamping action.

8. In a material winding machine, a rotatable arbor, means for feeding conductive and dielectric strips of material to the arbor to be wound thereupon, a terminal feed finger arranged to hold a terminal by vacuum, and means movable across the terminal holding portion of said feed finger for positively forcing the terminal free of the feed finger and for directing it between the convolutions of material upon the arbor.

9. In a material winding machine, a rotatable arbor, means for feeding conductive and dielectric strips of material to the arbor to be wound thereupon, a terminal feed finger arranged to hold a terminal by vacuum, means adjacent said feed finger and movable relative thereto for positively forcing the terminal free of the feed finger and for directing it between the convolutions of material upon the arbor, and means for feeding terminals to the feed finger.

10. In a material winding machine, a rotatable arbor, means for feeding conductive and dielectric strips of material to the arbor to be wound thereupon, a magazine for holding terminals spaced from the arbor, a feed finger movable from the magazine to a position adjacent the arbor, the feed finger being supplied with vacuum to attract and to hold the terminal from the magazine, means for moving the feed finger to its position adjacent the arbor, and an ejecting finger positioned adjacent the feed finger and movable relative thereto for positively forcing the terminal free of the feed finger and directing it between the convolutions of material upon the arbor.

11. In a winding machine, a rotatable arbor, means for feeding conductive and dielectric strips of material to the arbor to be wound thereupon, a feed finger arranged to hold the terminal by means of vacuum, an ejecting finger positioned adjacent the feed finger and the terminal carried thereby, and means for simultaneously moving the feed finger and the ejecting finger toward the arbor and for moving the ejecting finger relative to the feed finger for forcing the terminal free of the feed finger and directing it between the convolutions of the material upon the arbor.

12. In a material feeding machine, a rotatable winding arbor, means for feeding conductive and dielectric strips of material to the arbor to be wound thereupon, a magazine for holding terminals in stacked formation, a terminal supporting platform, means for removing the terminals singly from the magazine and positioning them upon the platform, and means for removing the terminal from the platform and inserting it between the convolutions of material upon the arbor.

13. In a material winding machine, a rotatable arbor, means for feeding strips of conductive and dielectric material to the arbor, a magazine for holding terminals in stacked formation, a plurality of platforms for supporting terminals, an ejecting member for ejecting terminals singly from the magazine and positioning them to be received by the platforms, means for moving the platforms relative to the ejecting member to cause one platform to move a terminal free of the ejecting member and for subsequently causing another platform to move the subsequent terminal from the ejecting member, and means for removing the terminals from the platforms and for inserting them between the convolutions of material upon the arbor.

14. In a material winding machine, a rotatable arbor, means for feeding strips of conductive and dielectric material to the arbor, a terminal feed finger having vacuum ports positioned adjacent one edge to attract terminals thereto, an ejecting finger positioned adjacent the feed finger and positioned to engage the terminal held by the feed finger, means for moving the ejecting finger a predetermined distance, means operatively connecting the ejecting finger to the feed finger to cause simultaneous movement of the fingers during the actuating of the ejecting finger, and means for stopping the movement of the feed finger so that the continued movement of the ejecting finger will force the terminal free of the feed finger and between the convolutions of material upon the arbor.

15. In a material winding machine, a rotatable arbor, means for feeding strips of conductive and dielectric material to the arbor, a magazine for holding terminals, platforms for receiving the terminals, an ejecting member for ejecting terminals from the magazine and positioning them upon the platforms, feed fingers for receiving the terminals from the platforms, ejecting fingers positioned adjacent the feed fingers, means for moving the feed fingers and their respective ejecting fingers from the platforms where they receive the terminals to positions adjacent the material upon the arbor, and means for actuating the ejecting member and platforms to position terminals upon the platforms, and for actuating the feed fingers and ejecting fingers to dispose the terminals betwen the convolutions of material upon the arbor.

16. In a material winding device, a rotatable arbor, means for feeding sheet foil, means for cutting the foil, means for clamping the foil while being cut, and means for directing a jet of air against the foil to free it from the clamp and to direct it to the arbor.

17. In a material winding machine, a rotatable arbor, means for feeding strips of conductive and dielectric material to the arbor, a magazine for holding terminals in stacked formation, a plurality of platforms for supporting terminals, means for removing terminals singly from the magazine and for disposing them upon the platforms, means for moving the platforms relative to the magazine for relatively positioning the platforms to receive the terminals, and means for removing the terminals from the platforms and inserting them between the convolutions of material upon the arbor.

18. In a material winding machine, a rotatable arbor, means for feeding strips of conductive and dielectric material to the arbor, a pair of terminal feed fingers, ejecting fingers disposed adjacent the feed fingers and arranged to engage terminals carried by the feed fingers, means for moving the ejecting fingers in predetermined sequence, means operatively connecting the ejecting fingers with their respective feed fingers to cause a simultaneous movement of the feed finger during the actuation of the ejecting fingers, and means for stopping the movement of the feed fingers during the actuation of the ejecting fingers so that the ejecting fingers will move the terminals free of the feed fingers and between different convolutions of the material upon the arbor at predetermined relative positions.

19. In a material winding machine, a rotatable arbor, means for feeding conductive and dielectric strips of material to the arbor to be wound thereupon, a terminal feed finger arranged to hold a terminal, and an ejecting member movable across the terminal holding portion of said feed finger for positively forcing the terminal free of the feed finger and for directing it between the convolutions of material upon the arbor.

20. In a material winding machine, a rotatable arbor, means for feeding conductive and dielectric strips of material to the arbor to be wound thereupon, a terminal feed finger arranged to hold a terminal, an ejecting finger movable across the terminal holding portion of said feed finger for positively forcing the terminal free of the feed finger and for directing it between the convolutions of material upon the arbor, and means for feeding terminals to the feed finger.

21. In a material winding machine, a rotatable arbor, means for feeding conductive and dielectric strips of material to the arbor to be wound thereupon, a feed finger arranged to hold the terminal, an ejecting finger positioned adjacent the feed finger and the terminal carried thereby, means for simultaneously moving the feed finger and the ejecting finger toward the arbor and for moving the ejecting finger relative to the feed finger for forcing the terminal free of the feed finger and directing it between the convolutions of the material upon the arbor.

22. In a material winding machine, a rotatable arbor, means for feeding strips of conductive and dielectric material to the arbor, terminal feed fingers for holding terminals to be fed between the strips of material, and ejecting fingers, one for each feed finger, for positively forcing the terminals free of the feed fingers to dispose the terminals between the convolutions of material upon the arbor at predetermined positions relative to the length of the material.

23. In a material winding machine, a rotatable arbor, means for feeding strips of conductive and dielectric material to the arbor, terminal feed fingers for holding terminals to be fed between the strips of material, and ejecting fingers movable relative to said feed fingers and operated in timed relation with the arbor for positively forcing the terminals free of the feed fingers in predetermined sequence to dispose the terminals between the convolutions of material upon the arbor at predetermined positions relative to the length of the material.

24. In a material winding machine, a rotatable arbor having flat sides, means for feeding strips of conductive and dielectric material to the arbor, terminal feed fingers for holding terminals to be fed between the strips of material, and ejecting fingers movable across the terminal holding portions of said feed fingers and operated in timed relation with the arbor for positively forcing the terminals free of the feed fingers to dispose the terminals between the convolutions of material upon the arbor so that they will be in substantially parallel planes with the flat sides of the arbor.

25. In a material winding machine, a rotatable winding arbor, means for feeding conductive and dielectric strips of material to the arbor to be wound thereupon, a magazine for holding terminals in stacked formation, terminal supporting platforms movable relative to the magazine, an ejecting member for ejecting terminals from the magazine, means for actuating the ejecting member, means for moving the platforms to respectively position them adjacent the ejecting member so that each platform will receive a terminal, and means for removing the terminals from the platforms and inserting them between the convolutions of material upon the arbor.

26. In a material winding machine, a rotatable winding arbor, means for feeding conductive and dielectric strips of material to be wound thereupon, a magazine for holding terminals in stacked formation, terminal supporting platforms movable relative to the magazine, a reciprocable ejecting member, means for actuating the ejecting member for ejecting a predetermined number of terminals from the magazine, means operated in synchronism with the ejector actuating means for moving the platforms to respectively position them adjacent the ejecting member so that each platform will receive a terminal, and means for removing the terminals from the platforms and inserting them between the convolutions of material upon the arbor.

27. In a material winding machine, a rotatable winding arbor, a material feeding unit for feeding material to the arbor, an element movable in one direction for moving the unit toward the arbor, the material feeding unit comprising means for gripping the material for advancing it toward the arbor, an arcuately movable arm, means for stopping the movement of the unit, and means actuated by the further movement of the movable element for moving the arm from its normal position arcuately about the arbor for wrapping the forward portion of the material about the arbor.

28. In a material winding machine, a rotatable winding arbor, a material feeding unit for feeding material to the arbor, an element movable in one direction for moving the unit toward the arbor, the material feeding unit comprising means for gripping the material for advancing it toward the arbor, an arcuately movable arm, means for rocking the unit arcuately to position the arm adjacent the arbor, means for stopping the movement of the unit, means for releasing the gripping means, and means actuated by the further movement of the movable element for moving the arm from its normal position arcuately about the arbor for wrapping the forward portion of the material about the arbor.

29. In a material winding machine, a rotatable winding arbor, a material feeding unit for feeding material to the arbor, an element movable in one direction for moving the unit toward the arbor, the material feeding unit comprising means for gripping the material, advancing it toward the arbor, an arcuately movable arm, means for rocking the unit arcuately to position the arm adjacent the arbor, means for stopping the movement of the unit, means for releasing the gripping means, and means actuated by the further movement of the movable element for moving the arm from its normal position arcuately about the arbor and wrapping the forward portion of the material about the arbor, the movement of the element in another direction causing the arm actuating means to move the arm to its normal position and then move the unit relative to the material away from the arbor.

30. In a material winding machine, a rotatable winding arbor, means for supplying material to the winding arbor a roller positioned in engagement with the material, an arm positioned adjacent the material, means for moving the roller to cause it to hold the material in engagement with the arbor, and means for moving the arm arcuately about the arbor to tuck the forward portion of the material between the arbor and the portion of the material adjacent the roller to start the winding of the material upon the arbor.

31. In a material winding machine, a rotatable winding arbor, means for supplying material to the winding arbor, a roller having peripheral grooves therein positioned in engagement with the material, an arm having projecting fingers thereon positioned adjacent the material, means for moving the roller to cause it to hold the material in engagement with the arbor, and means for moving the arm arcuately about the arbor to tuck the forward portion of the material between the arbor and the portion of the material adjacent the roller to start the winding of the material upon the arbor, the projecting fingers on the arm being positioned to register with the peripheral grooves of the roller when the arm is actuated.

CECIL C. McCAIN.